US012707481B2

(12) United States Patent
Abotabl et al.

(10) Patent No.: US 12,707,481 B2
(45) Date of Patent: Aug. 11, 2026

(54) COMMON TIME RESOURCES FOR MULTICASTING

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Le Liu, San Jose, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 17/948,033

(22) Filed: Sep. 19, 2022

(65) Prior Publication Data

US 2024/0098759 A1 Mar. 21, 2024

(51) Int. Cl.
*H04W 72/30* (2023.01)
*H04W 72/23* (2023.01)

(52) U.S. Cl.
CPC ........... *H04W 72/30* (2023.01); *H04W 72/23* (2023.01)

(58) Field of Classification Search
CPC .. H04W 72/0446; H04W 72/23; H04W 72/30
See application file for complete search history.

(56) References Cited

U.S. PATENT DOCUMENTS 7,315,523 B2 * 1/2008 Cai ......................... H04W 4/02 455/503
8,149,793 B2 * 4/2012 Baker .................... H04H 60/61 370/336
9,660,827 B2 * 5/2017 Moskaluk ............. H04L 12/189
11,070,951 B2 * 7/2021 Abdoli .................. H04W 72/30
11,832,089 B2 * 11/2023 Abdoli ..................... H04W 4/06
11,996,947 B2 * 5/2024 Wang ..................... H04L 1/1819
12,096,458 B2 * 9/2024 Miao ..................... H04W 72/30
(Continued)

FOREIGN PATENT DOCUMENTS

CN 116671136 A * 8/2023 ............ H04W 24/08
CN 112970237 B * 8/2024 ........... H04L 1/1812
(Continued)

OTHER PUBLICATIONS

Samsung (Moderator): "Draft SID on Evolution of NR Duplex Operation", 3GPP TSG RAN#94-e, RP-212707, Electronic Meeting, Dec. 6-17, 2021, 4 Pages.

*Primary Examiner* — Eric Nowlin
(74) *Attorney, Agent, or Firm* — Holland & Hart LLP

(57) ABSTRACT

Methods, systems, and devices for wireless communications are described. For instance, a user equipment (UE) may receive, from a network entity, an indication of a set of time resource common to a set of UEs and available for communication of a multicast transmission from the network entity to two or more of the set of UEs, where the two or more of the set of UEs includes the UE, and where the set of time resources are a subset of a plurality of time resources of a carrier configured for the UE. The UE may receive, from the network entity, a grant for the multicast transmission and the multicast transmission over a subset of the set of resources, where the subset of the set of time resources is determined based on scheduling information associated with the grant and the indication of the set of time resources.

30 Claims, 17 Drawing Sheets

(56) References Cited

U.S. PATENT DOCUMENTS 12,108,417 B2 * 10/2024 Liu .................... H04W 72/30
12,452,858 B2 * 10/2025 Awadin ................ H04W 72/23
2007/0081480 A1 * 4/2007 Cai .................... H04W 4/02 370/312
2008/0267136 A1 * 10/2008 Baker .................. H04H 20/72 370/336
2009/0262699 A1 * 10/2009 Wengerter ........... H04L 1/1812 370/330
2011/0038298 A1 * 2/2011 Tomita ................ H04H 20/30 370/312
2017/0303157 A1 * 10/2017 Siomina ................ H04W 4/06
2020/0008253 A1 * 1/2020 Wakabayashi ........ H04W 76/11
2020/0267511 A1 * 8/2020 Abdoli .................. H04L 5/001
2021/0314738 A1 * 10/2021 Abdoli .................. H04W 80/08
2022/0022222 A1 * 1/2022 Abotabl ............ H04W 72/0453
2022/0046591 A1 * 2/2022 Miao ................. H04W 72/0446
2022/0124675 A1 * 4/2022 Liu .................... H04W 72/56
2022/0303892 A1 * 9/2022 Awadin ............. H04W 52/0229
2022/0321281 A1 * 10/2022 Yao .................. H04W 72/0446
2022/0330060 A1 * 10/2022 Awadin .............. H04B 7/06964
2022/0394805 A1 * 12/2022 Chen .................. H04W 72/30
2023/0037266 A1 * 2/2023 Liu .................... H04L 1/1854
2023/0071767 A1 * 3/2023 Zhou .................. H04L 1/1854
2023/0083445 A1 * 3/2023 Awadin ................ H04L 5/0044 370/329
2023/0097512 A1 * 3/2023 Yao .................... H04L 5/0053 370/329
2023/0269828 A1 * 8/2023 Shrivastava .......... H04W 48/08 370/312
2023/0345508 A1 * 10/2023 Lei ................... H04W 72/0453
2024/0049254 A1 * 2/2024 Liu ..................... H04W 72/30
2024/0080141 A1 * 3/2024 Zhou .................. H04L 1/1607
2024/0089996 A1 * 3/2024 Xu ..................... H04W 72/20
2024/0196173 A1 * 6/2024 Chen ................. H04W 72/121
2024/0260024 A1 * 8/2024 Lee ..................... H04L 5/001
2024/0313902 A1 * 9/2024 Wang .................. H04W 72/40
2024/0373296 A1 * 11/2024 Chen .................. H04W 72/30
2025/0063579 A1 * 2/2025 Mu ..................... H04W 24/08
2025/0132890 A1 * 4/2025 Zhang ................. H04L 5/0094
2025/0192927 A1 * 6/2025 Zhou .................. H04W 72/30
2025/0280468 A1 * 9/2025 Xu ....................... H04W 4/06

FOREIGN PATENT DOCUMENTS

EP 4287713 A1 * 12/2023 .............. H04W 4/06
EP 3918857 B1 * 11/2024 ........... H04L 1/0061
EP 4460049 A1 * 11/2024 ............ H04W 24/08
WO WO-2020164404 A1 * 8/2020 ........... H04L 1/0061
WO WO-2022206154 A1 * 10/2022 .............. H04W 4/06
WO WO-2023122918 A1 * 7/2023 ............ H04W 24/08
WO WO-2023245445 A1 * 12/2023 ........... H04L 5/0005

* cited by examiner

COMMON TIME RESOURCES FOR MULTICASTING

FIELD OF TECHNOLOGY

The following relates to wireless communications, including common time resources for multi casting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support common time resources for multicasting. For example, the described techniques provide for a network device to mitigate the likelihood that the network device attempts to transmit a multicast transmission using communication parameters that do not account for a cross-link interference (CLI) and/or self-interference at a full-duplex UE. In some examples, a UE may receive, from a network entity, an indication of a set of time resource common to a set of UEs and available for communication of a multicast transmission from the network entity to two or more of the set of UEs, where the two or more of the set of UEs includes the UE, and where the set of time resources are a subset of a plurality of time resources of a carrier configured for the UE. The UE may receive, from the network entity, a grant for the multicast transmission and the multicast transmission over a subset of the set of resources, where the subset of the set of time resources is determined based on scheduling information associated with the grant and the indication of the set of time resources.

A method for wireless communication at a user equipment (UE) is described. The method may include receiving, from a network entity, an indication of a set of time resources common to a set of UEs and available for communication of a multicast transmission from the network entity to two or more of the set of UEs, where the two or more of the set of UEs includes the UE, and where the set of time resources are a subset of a set of multiple time resources of a carrier configured for the UE, receiving, from the network entity, a grant for the multicast transmission, and receiving, from the network entity, the multicast transmission over a subset of the set of time resources, where the subset of the set of time resources is determined based on scheduling information associated with the grant and the indication of the set of time resources.

An apparatus for wireless communication at a UE is described. The apparatus may include a processor, memory coupled with the processor, and instructions stored in the memory. The instructions may be executable by the processor to cause the apparatus to receive, from a network entity, an indication of a set of time resources common to a set of UEs and available for communication of a multicast transmission from the network entity to two or more of the set of UEs, where the two or more of the set of UEs includes the UE, and where the set of time resources are a subset of a set of multiple time resources of a carrier configured for the UE, receive, from the network entity, a grant for the multicast transmission, and receive, from the network entity, the multicast transmission over a subset of the set of time resources, where the subset of the set of time resources is determined based on scheduling information associated with the grant and the indication of the set of time resources.

Another apparatus for wireless communication at a UE is described. The apparatus may include means for receiving, from a network entity, an indication of a set of time resources common to a set of UEs and available for communication of a multicast transmission from the network entity to two or more of the set of UEs, where the two or more of the set of UEs includes the UE, and where the set of time resources are a subset of a set of multiple time resources of a carrier configured for the UE, means for receiving, from the network entity, a grant for the multicast transmission, and means for receiving, from the network entity, the multicast transmission over a subset of the set of time resources, where the subset of the set of time resources is determined based on scheduling information associated with the grant and the indication of the set of time resources.

A non-transitory computer-readable medium storing code for wireless communication at a UE is described. The code may include instructions executable by a processor to receive, from a network entity, an indication of a set of time resources common to a set of UEs and available for communication of a multicast transmission from the network entity to two or more of the set of UEs, where the two or more of the set of UEs includes the UE, and where the set of time resources are a subset of a set of multiple time resources of a carrier configured for the UE, receive, from the network entity, a grant for the multicast transmission, and receive, from the network entity, the multicast transmission over a subset of the set of time resources, where the subset of the set of time resources is determined based on scheduling information associated with the grant and the indication of the set of time resources.

Some examples of the method, apparatuses, and non-transitory computer-readable medium described herein may further include operations, features, means, or instructions for updating the set of time resources based on adjusting from communicating with the network entity in a first bandwidth part to communicating with the network entity in a second bandwidth part.

Some examples of the method, apparatuses, and non-transitory computer-readable medium described herein may further include operations, features, means, or instructions for receiving a null indication of the set of time resources, determining that each time resource within the set of multiple time resources may be available for communication of a second multicast transmission from the network entity based on receiving the null indication of the set of time resources, and receiving a second multicast transmission over a subset of the set of multiple time resources based on the determining.

In some examples of the method, apparatuses, and non-transitory computer-readable medium described herein, each time resource of the set of time resources corresponds to a respective symbol within a slot and the set of multiple time resources spans the slot.

In some examples of the method, apparatuses, and non-transitory computer-readable medium described herein, each time resource of the set of time resources corresponds to a respective slot within a frame or a sub-frame and the set of multiple time resources spans the frame or the sub-frame.

In some examples of the method, apparatuses, and non-transitory computer-readable medium described herein, the indication of the set of time resources includes a bitmap or a start and length indicator value.

In some examples of the method, apparatuses, and non-transitory computer-readable medium described herein, a first slot and a second slot may be associated with different sets of time resources common to the set of UEs and available for communication of the multicast transmission based on the first slot being associated with a first transmission mode and the second slot being associated with a second transmission mode.

In some examples of the method, apparatuses, and non-transitory computer-readable medium described herein, a first slot may be associated with a first transmission mode and a second slot may be associated with a second transmission mode and each of the first slot and the second slot may be associated with the set of time resources.

In some examples of the method, apparatuses, and non-transitory computer-readable medium described herein, the subset of the set of time resources includes an earliest time resource of the set of time resources and the earliest time resource of the set of time resources differs from an earliest time resource of the set of multiple time resources.

A method for wireless communication at a network entity is described. The method may include transmitting, to a UE, an indication of a set of time resources common to a set of UEs and available for communication of a multicast transmission from the network entity to two or more of the set of UEs, where the two or more of the set of UEs includes the UE, and where the set of time resources are a subset of a set of multiple time resources, transmitting, to the two or more of the set of UEs, a grant for the multicast transmission, and transmitting, to the two or more of the set of UEs, the multicast transmission over a subset of the set of time resources, where the subset of the set of time resources for transmitting the multicast transmission is based on scheduling information associated with the grant.

An apparatus for wireless communication at a network entity is described. The apparatus may include a processor, memory coupled with the processor, and instructions stored in the memory. The instructions may be executable by the processor to cause the apparatus to transmit, to a UE, an indication of a set of time resources common to a set of UEs and available for communication of a multicast transmission from the network entity to two or more of the set of UEs, where the two or more of the set of UEs includes the UE, and where the set of time resources are a subset of a set of multiple time resources, transmit, to the two or more of the set of UEs, a grant for the multicast transmission, and transmit, to the two or more of the set of UEs, the multicast transmission over a subset of the set of time resources, where the subset of the set of time resources for transmitting the multicast transmission is based on scheduling information associated with the grant.

Another apparatus for wireless communication at a network entity is described. The apparatus may include means for transmitting, to a UE, an indication of a set of time resources common to a set of UEs and available for communication of a multicast transmission from the network entity to two or more of the set of UEs, where the two or more of the set of UEs includes the UE, and where the set of time resources are a subset of a set of multiple time resources, means for transmitting, to the two or more of the set of UEs, a grant for the multicast transmission, and means for transmitting, to the two or more of the set of UEs, the multicast transmission over a subset of the set of time resources, where the subset of the set of time resources for transmitting the multicast transmission is based on scheduling information associated with the grant.

A non-transitory computer-readable medium storing code for wireless communication at a network entity is described. The code may include instructions executable by a processor to transmit, to a UE, an indication of a set of time resources common to a set of UEs and available for communication of a multicast transmission from the network entity to two or more of the set of UEs, where the two or more of the set of UEs includes the UE, and where the set of time resources are a subset of a set of multiple time resources, transmit, to the two or more of the set of UEs, a grant for the multicast transmission, and transmit, to the two or more of the set of UEs, the multicast transmission over a subset of the set of time resources, where the subset of the set of time resources for transmitting the multicast transmission is based on scheduling information associated with the grant.

Some examples of the method, apparatuses, and non-transitory computer-readable medium described herein may further include operations, features, means, or instructions for updating the set of time resources based on adjusting from communicating with the UE in a first bandwidth part to communicating with the UE in a second bandwidth part.

Some examples of the method, apparatuses, and non-transitory computer-readable medium described herein may further include operations, features, means, or instructions for transmitting a null indication of the set of time resources, determining that each time resource within the set of multiple time resources may be available for communication of a second multicast transmission from the network entity based on transmitting the null indication of the set of time resources, and transmitting a second multicast transmission over a subset of the set of multiple time resources based on the determining.

In some examples of the method, apparatuses, and non-transitory computer-readable medium described herein, each time resource of the set of time resources corresponds to a respective symbol within a slot and the set of multiple time resources spans the slot.

In some examples of the method, apparatuses, and non-transitory computer-readable medium described herein, each time resource of the set of time resources corresponds to a respective slot within a frame or a sub-frame and the set of multiple time resources spans the frame or the sub-frame.

In some examples of the method, apparatuses, and non-transitory computer-readable medium described herein, the indication of the set of time resources includes a bitmap or a start and length indicator value.

In some examples of the method, apparatuses, and non-transitory computer-readable medium described herein, a first slot and a second slot may be associated with different sets of time resources common to the set of UEs and available for communication of the multicast transmission based on the first slot being associated with a first transmission mode and the second slot being associated with a second transmission mode.

In some examples of the method, apparatuses, and non-transitory computer-readable medium described herein, a first slot may be associated with a first transmission mode and a second slot may be associated with a second transmission mode and each of the first slot and the second slot may be associated with the set of time resources.

In some examples of the method, apparatuses, and non-transitory computer-readable medium described herein, the subset of the set of time resources includes an earliest time resource of the set of time resources and the earliest time resource of the set of time resources differs from an earliest time resource of the set of multiple time resources

DETAILED DESCRIPTION

Figure 1:
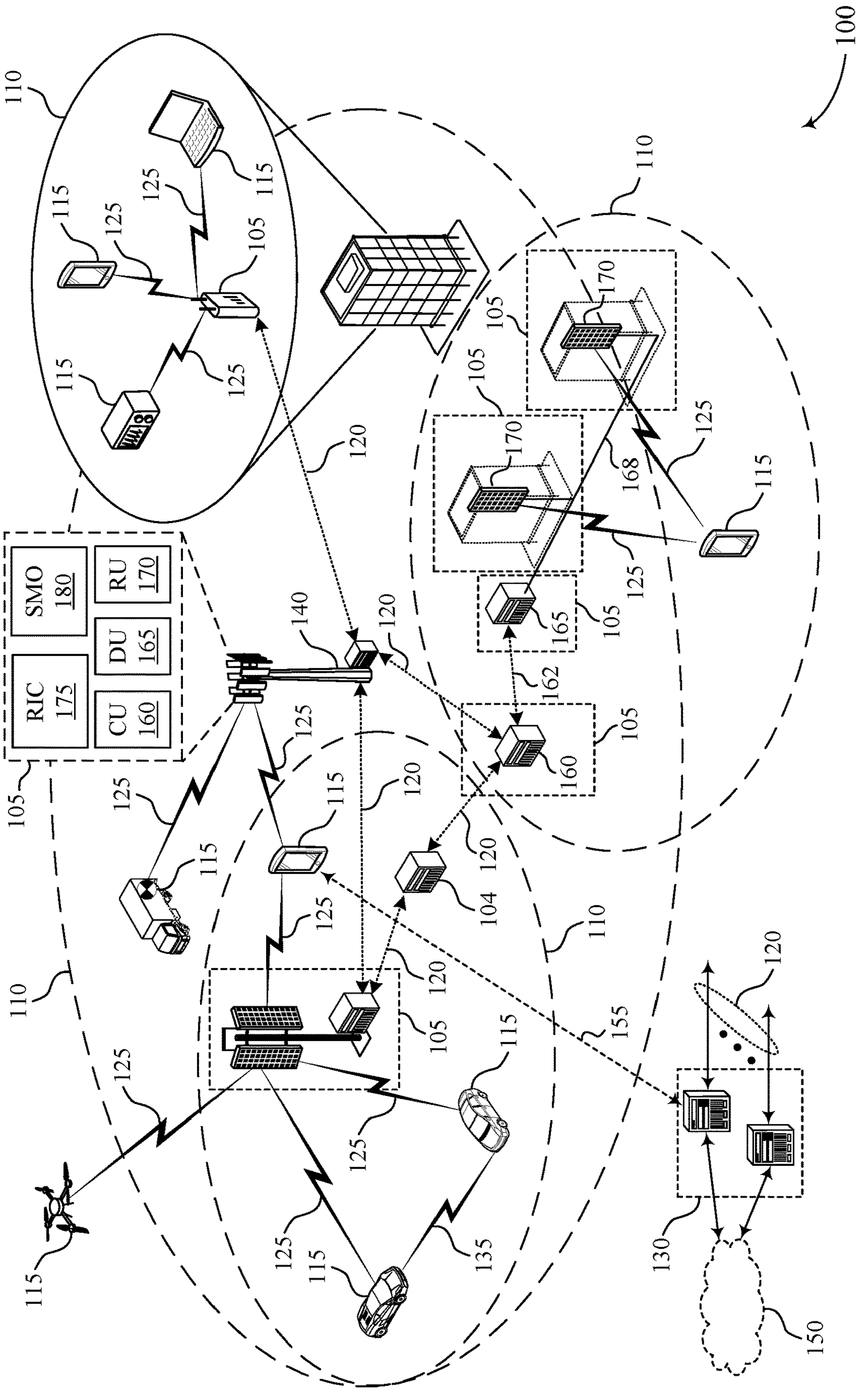
FIG. 1 illustrates an example of a wireless communications system that supports common time resources for multicasting in accordance with one or more aspects of the present disclosure.

In some examples, user equipment (UE) may be half-duplex or full-duplex. For instance, if a UE is half-duplex, the UE may be capable of transmitting or receiving communications from a network entity (e.g., a base station) over a carrier, but may not do so over the carrier simultaneously. If a UE is full-duplex, however, the UE may be capable of transmitting and receiving communications from the network entity over the carrier simultaneously. In some examples, resources for a given time resource (e.g., a slot, a symbol, a sub-slot) may be different for half-duplex UEs as compared to full-duplex UEs. For instance, a time resource (e.g., a slot, a symbol, a sub-slot) configured for downlink communications for a half-duplex UE may also be configured for both downlink communications and uplink communications for a full-duplex UE.

In some examples, multicast transmissions in full-duplex time resources (e.g., time resources used for simultaneous uplink and downlink communications) may be associated with different communications parameters (e.g., transmit power, beam shape, beam width, beam weights, other beam or transmit parameters) as compared to transmissions in half-duplex time resources (e.g., time resources used for just downlink communications or uplink communications), which may help to mitigate self-interference and/or cross-link interference (CLI). When these time resources overlap and a downlink multicast transmission is to be transmitted, the network entity may be incapable of determining which set of communications parameters to use for this multicast transmission.

In order to mitigate the likelihood of the network entity attempting to transmit a multicast transmission during full-duplex time resources that overlap with half-duplex time resources, the network entity may transmit, to two or more of a set of UEs receiving a multicast transmission (e.g., half-duplex UEs, full-duplex UEs, or both), an indication of a set of time resources common to the set of UEs and available for communication of the multicast transmission from the network entity to the two or more of the set of UEs. Such an indication may be referred to as common time resources (CTR). Additionally, the network entity may transmit a grant for the multicast transmission and may transmit, to the two or more of the set of UEs, the multicast transmission over a subset of the set of indicated time resources, where the subset of the set of time resources is determined based on scheduling information associated with the grant and the indication of the set of time resources. Using these time resources may enable the network entity to use the communications parameters associated with transmitting in half-duplex time resources (e.g., as the indicated time resources may be time resources during which the full-duplex UEs and half-duplex UEs are configured to receive just downlink transmissions from the network entity).

Aspects of the disclosure are initially described in the context of wireless communications systems. Additional aspects of the disclosure are described in the context of a symbol-level resource scheme, a time domain resource assignment scheme, and a process flow. Aspects of the disclosure are further illustrated by and described with reference to apparatus diagrams, system diagrams, and flowcharts that relate to common time resources for multicasting.

FIG. 1 illustrates an example of a wireless communications system 100 that supports common time resources for multicasting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support common time resources for multicasting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may operate in an in-band full-duplex (IBFD) mode. In some such examples, the UE 115 may transmit and receive on the same time and frequency resource(s). For instance, downlink and uplink communications may occur on the same IBFD time and frequency resource(s), where there is full overlap or partial overlap between the uplink and downlink communications. Alternatively, the UE 115 may operate in a sub-band full-duplex (SBFD) mode, which may also be referred to as flexible duplex. When operating in the SBFD mode, the UE 115 may transmit and receive on the same time resource(s) but on different frequency resources. For instance, the downlink resource may be separated from the uplink resource in the frequency domain (e.g., by a guard band).

In some examples, UEs 115 may be half-duplex or full-duplex. For instance, if a UE 115 is half-duplex, the UE 115 may be capable of transmitting or receiving communications from a network entity 105 (e.g., a base station), but may not do so simultaneously. If a UE 115 is full-duplex, however, the UE 115 may be capable of transmitting and receiving communications from the network entity 105 simultaneously. In some examples, resources for a given time resource (e.g., a slot, a symbol, a sub-slot) may be different for half-duplex UEs 115 as compared to full-duplex UEs 115. For instance, a time resource (e.g., a slot, a symbol, a sub-slot) configured for downlink communications for a half-duplex UE 115 may also be configured for both downlink communications and uplink communications for a full-duplex UE 115.

In some examples, multicast transmissions in full-duplex time resources (e.g., time resources used for simultaneous uplink and downlink communications) may be associated with different communications parameters (e.g., transmit power, beam shape, beam width, beam weights, other beam or transmit parameters) as compared to transmissions in half-duplex time resources (e.g., time resources used for just downlink communications or uplink communications), which may help to mitigate self-interference and/or cross-link interference (CLI). When these time resources overlap and a downlink multicast transmission is to be transmitted, the network entity 105 may be incapable of determining which set of communications parameters to use for this multicast transmission.

In order to mitigate the likelihood of the network entity 105 attempting to transmit a multicast transmission during full-duplex time resources that overlap with half-duplex time resources, the network entity 105 may transmit, to two or more of a set of UEs 115 receiving a multicast transmission (e.g., half-duplex UEs 115, full-duplex UEs 115, or both), an indication of a set of time resources common to the set of UEs 115 and available for communication of the multicast transmission from the network entity 105 to the two or more of the set of UEs 115. Such an indication may be referred to as common time resources (CTR). Additionally, the network entity 105 may transmit a grant for the multicast transmission and may transmit, to the two or more of the set of UEs 115, the multicast transmission over a subset of the set of indicated time resources, where the subset of the set of time resources is determined based on scheduling information associated with the grant and the indication of the set of time resources. Using these time resources may enable the network entity 105 to use the communications parameters associated with transmitting in half-duplex time resources (e.g., as the indicated time resources may be time resources during which the full-duplex UEs 115 and half-duplex UEs 115 are configured to receive just downlink transmissions from the network entity 105).

Figure 2:
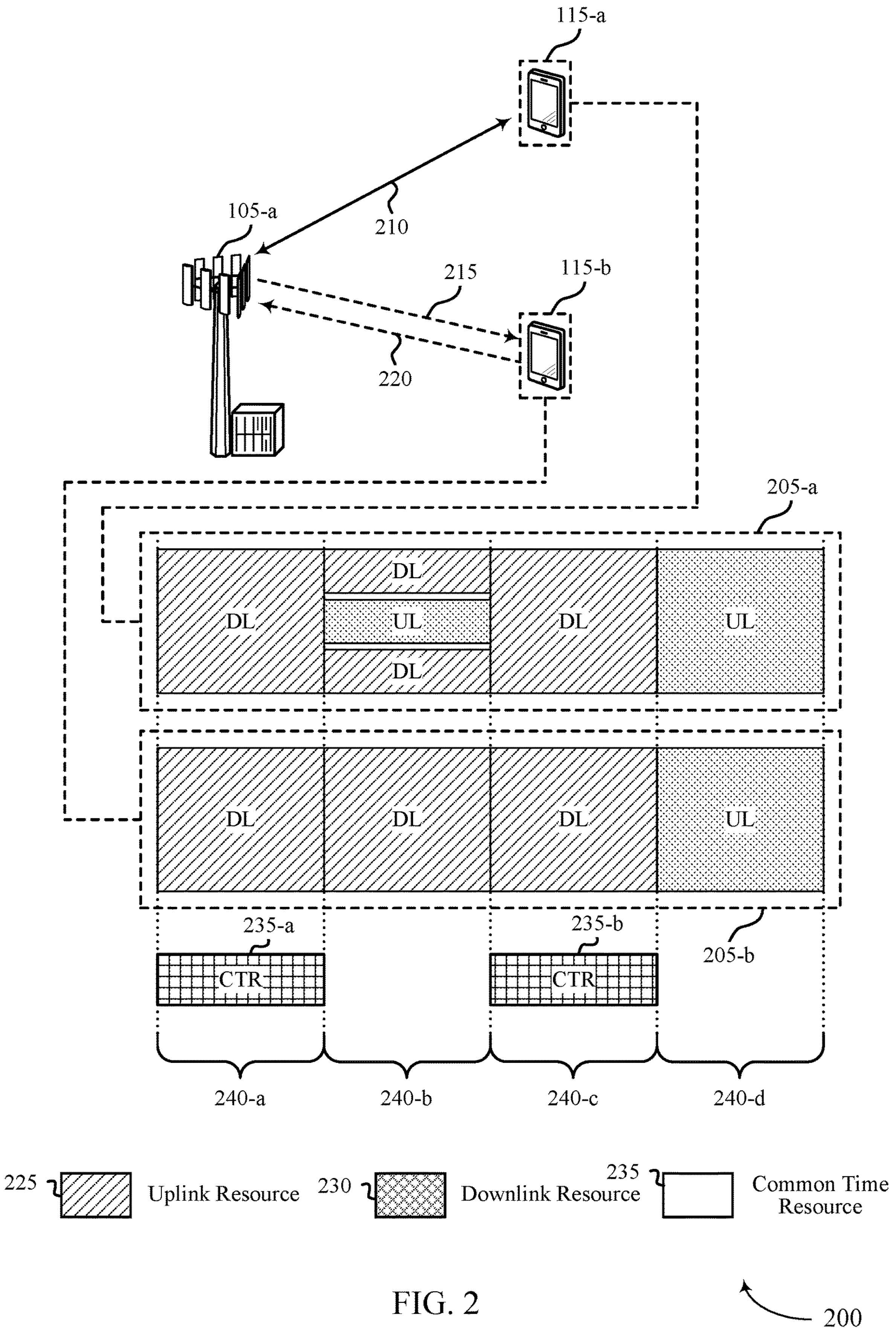
FIG. 2 illustrates an example of a wireless communications system that supports common time resources for multicasting in accordance with one or more aspects of the present disclosure.

FIG. 2 illustrates an example of a wireless communications system 200 that supports common time resources for multicasting in accordance with one or more aspects of the present disclosure. In some examples, wireless communications system 200 may implement one or more aspects of wireless communications system 100. For instance, UEs 115-*a* and 115-*b* may be example of UEs 115 as described with reference to FIG. 1 and network entity 105-*a* may be an example of a network entity 105 as described with reference to FIG. 1. Additionally, UE 115-*a* may be an example of a full-duplex UE 115 and UE 115-*b* may be an example of a half-duplex UE 115 as described herein. For instance, UE 115-*a* may perform simultaneous uplink and downlink communications over communication link 210, whereas UE 115-*b* may perform either downlink communication over communications link 215 or uplink communications over communication link 220, but not both simultaneously.

In a full-duplex network, multiple types of UEs may be present. For instance, a first type of UE may be a half-duplex UE and may identify half-duplex time resources (e.g., full-duplex slots, full-duplex sub-slots, full-duplex symbols), but may not be configured to identify half-duplex time resources (e.g., half-duplex slots, half-duplex sub-slots, half-duplex symbols). Additionally or alternatively, a second type of UE may be a half-duplex UE and may differentiate between half-duplex time resources and full-duplex time resources (e.g., may be full-duplex aware). Additionally or alternatively, a third type of UE may be a full-duplex UE (e.g., may be full-duplex capable) and may differentiate between half-duplex time resources and full-duplex time resources. UE 115-*a* may be the third type of UE and UE 115-*b* may be the first type or the second type of UE.

In some examples, multicast transmissions in full-duplex time resources (e.g., time resources used for simultaneous uplink and downlink communications) may be associated with different communications parameters (e.g., transmit power, beam shape, beam width, beam weights, other beam or transmit parameters) as compared to transmissions in half-duplex time resources (e.g., time resources used for just downlink communications or uplink communications), which may help to mitigate self-interference and/or CLI. When these time resources overlap and a downlink multicast transmission is to be transmitted, the network entity 105 may be incapable of determining which set of communications parameters to use for this multicast transmission. Additionally, the presence of multiple types of UE may make some downlink time resources for a half-duplex UE not available for multicasting (e.g., if these downlink time resources overlap with time resources for full-duplex UEs in which the full-duplex UEs are performing simultaneous uplink and downlink communications). Additionally, the format of the time resource (e.g., the slot format) may be UE-specific even among UEs of the same type, so some time resources available for one UE of a particular type may not be available for another of the same type. In some examples, the format of the time resource may vary at the symbol-level.

In order to mitigate the likelihood of the network entity attempting to transmit a multicast transmission during full-duplex time resources that overlap with half-duplex time resources, the network entity may transmit, to two or more of a set of UEs (e.g., UEs 115-*a* and 115-*b*), an indication of a set of time resources common to the set of UEs and available for communication of the multicast transmission from network entity 105-*a* to the two or more of the set of UEs. Such an indication may be referred to as CTR. Additionally, the network entity 105-*a* may transmit a grant for the multicast transmission and may transmit, to the two or more of the set of UEs, the multicast transmission over a subset of the set of indicated time resources, where the subset of the set of time resources is determined based on scheduling information associated with the grant and the indication of the set of time resources. Using these time resources may enable the network entity 105-*a* to use the communications parameters associated with transmitting in half-duplex time resources (e.g., as the indicated time resources may be time resources during which the full-duplex UEs and half-duplex UEs are configured to receive just downlink transmissions from the network entity 105-*a*).

In one example, UE 115-*a* may be configured with a time resource format (e.g., slot format) 205-*a* and UE 115-*b* may be configured with a time resource format (e.g., slot format) 205-*b*. In some examples, time resource formats 205-*a* and 205-*b* may be associated with the same type of resources for a particular time resource. For instance, for time resources 240-*a* and 240-*c*, both time resource formats 205-*a* and 205-*b* may be associated with half-duplex communications (e.g., may have only downlink resources 230). Additionally, for time resource 240-*d*, both time resource formats 205-*a* and 205-*b* may be associated with half-duplex communication (e.g., may have just uplink resources 225). However, for time resource 240-*b*, time resource format 205-*a* may be associated with full-duplex communications (e.g., may have both uplink resources 225 and downlink resources 230), whereas time resource format 205-*b* may be associated with half-duplex communications (e.g., may have just downlink resources 230). Because time resources 240-*a* and 240-*c* are associated with the same type of resources for time resource formats 205-*a* and 205-*b* and are downlink resources 230, network entity 105-*a* may indicate CTRs 235 for these time resources. For instance, network entity 105-*a* may indicate CTR 235-*a* for time resource 240-*a* and may indicate CTR 235-*b* for time resource 240-*c*. However, because time resource 240-*b* is associated with different types of resources for time resource formats 205-*a* and 205-*b*, network entity 105-*a* may not indicate that time resource 240-*b* is part of CTR 235. Additionally, although time resource 240-*d* is associated with a same type of resource for time resource formats 205-*a* and 205-*b*, because the resources are uplink resources 225, the network entity 105-*a* may not indicate that time resource 240-*d* is part of CTR 235. In some examples, each of time resources 240-*a* through 240-*d* may span a slot or sub-slot.

In some examples, time resource 240-*b* for time resource format 205-*a* may be an example of an SBFD slot. However, there may be examples in which time resource 240-*b* is an IBFD slot (e.g., or an IBFD sub-slot or IBFD symbol) without deviating from the scope of the present disclosure. In some examples, the format of the slot may be defined as a "D+U" slot. For instance, the "D+U" slot may be defined as a slot in which a band is used for both uplink and downlink transmissions. The downlink and uplink transmissions may occur in overlapping bands (e.g., IBFD) or adjacent bands (e.g., SBFD). In a given "D+U" symbol, a half-duplex UE may either transmit in an uplink band or receive in a downlink band. Meanwhile, for the given "D+U" symbol, a full-duplex UE may transmit in the uplink band and/or receive in the downlink band in the same time resource (e.g., the same slot). A "D+U" time resource may contain downlink-only symbols, uplink-only symbols, or full-duplex symbols (e.g., symbols for both uplink and downlink transmissions).

In some examples, time resources 240-*a*, 240-*b*, 240-*c*, and 240-*d* may be examples of slots and the CTR 235 may be a slot-level CTR 235. In some such examples, the slot level CTR may indicate multicasting slots in a pre-specified period of time or for each frame and may define the available time slots using a bitmap or a start and length indicator value (SLIV). In some examples, the CTR may depend on the slot type or frame type. For instance, a first CTR 235 may be defined for a full-duplex slot or a full-duplex frame (e.g., a frame in which at least some full-duplex communications occur) and a second, different CTR 235 may be defined for a half-duplex slot or a half-duplex frame (e.g., a frame in which only half-duplex communications occur). Additionally or alternatively, the CTR may be the same for each type of slot or each type of frame.

In some examples, the CTR may change based on the operating bandwidth part (BWP). For example, a narrow-band BWP (e.g., a BWP with a width below a predefined threshold) may fall with a half-duplex-only region, in which CTR may not be configured or a CTR for all available time resources may be configured. Accordingly, if the operating BWP changes, the CTR may also change. Additionally, if no CTR is configured or if a null value for a CTR is configured, UEs may determine that all time resources are available for multicasting.

In some examples, performing the methods described herein may be associated with one or more advantages. For instance, configuring CTR 235 may mitigate the likelihood of network entity 105-*a* attempting to transmit a multicast transmission during full-duplex time resources that overlap with half-duplex time resources. Accordingly, the CLI and/or self-interference experienced by full-duplex UEs may be accounted for by the full-duplex UEs, as the full-duplex UEs may not receive multicast transmissions for both half-duplex UEs and full-duplex UEs during such time resources.

Figure 3:
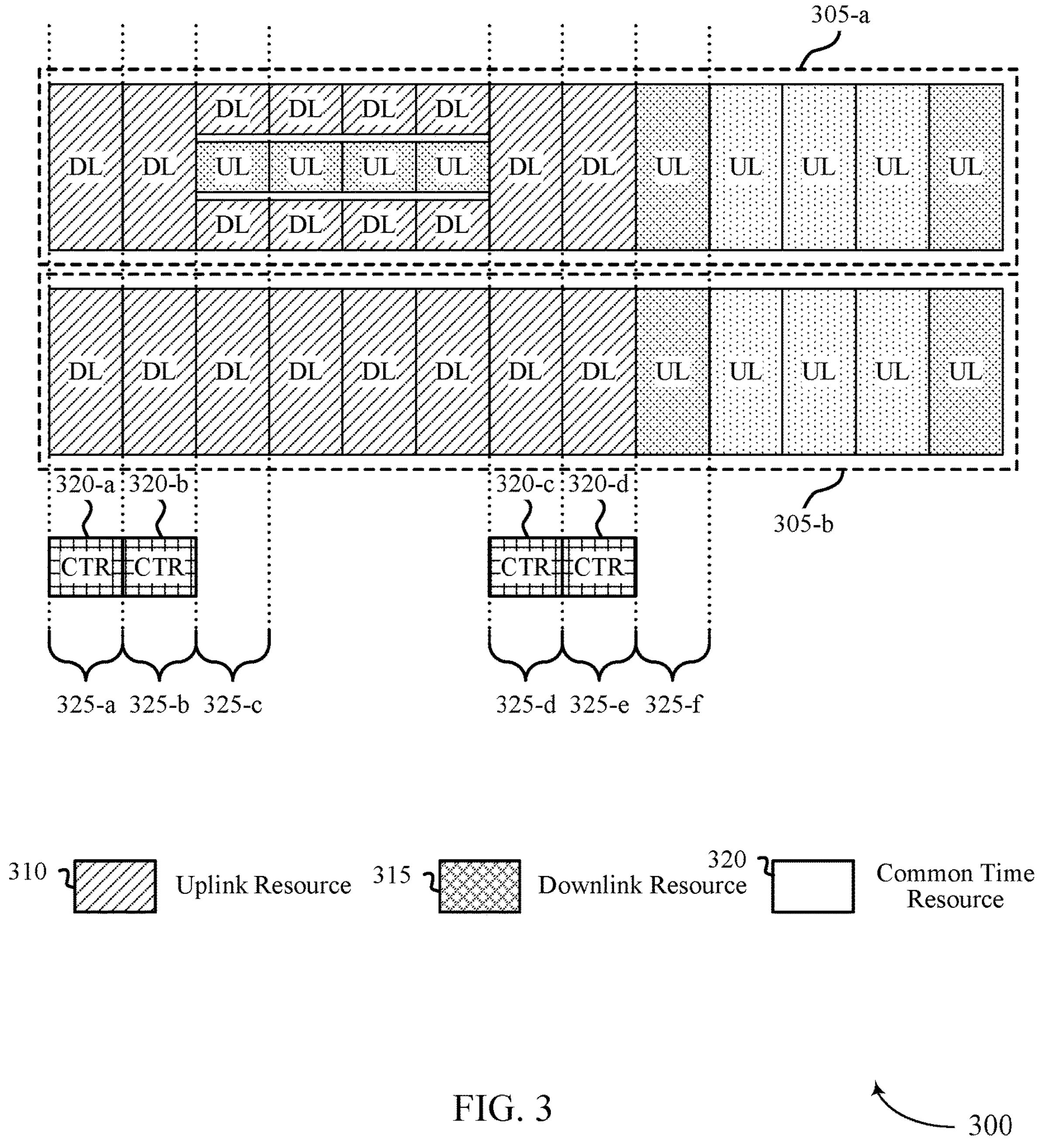
FIG. 3 illustrates an example of a symbol-level resource scheme that supports common time resources for multicasting in accordance with one or more aspects of the present disclosure.

FIG. 3 illustrates an example of a symbol-level resource scheme 300 that supports common time resources for multicasting in accordance with one or more aspects of the present disclosure. In some examples, symbol-level resource scheme 300 may implement one or more aspects of wireless communications system 200. For instance, time resource formats 305-*a* and 305-*b* may be examples of time resource formats 205 as described with reference to FIG. 2. In the present example, time resource format 305-*a* may be associated with a full-duplex UE 115 (e.g., UE 115-*a* as described with reference to FIG. 2) and time resource format 305-*b* may be associated with a half-duplex UE 115 (e.g., UE 115-*b* as described with reference to FIG. 2).

In some examples, time resource formats 305-*a* may be associated with the same type of resources for a particular time resource. For instance, for time resources 325-*a*, 325-*b*, 325-*d*, and 325-*e*, time resource formats 305-*a* and 305-*b* may be associated with half-duplex communications (e.g., may have only downlink resources 315). Additionally, for time resource 325-*f*, both time resource formats 305-*a* and 305-*b* may be associated with half-duplex communication (e.g., may have just uplink resources 310). However, for time resource 325-*c*, time resource format 305-*a* may be associated with full-duplex communications (e.g., may have both uplink resources 310 and downlink resources 315), whereas time resource format 305-*b* may be associated with half-duplex communications (e.g., may have just downlink resource 315). Because time resources 325-*a*, 325-*b*, 325-*d*, and 325-*e* are associated with the same type of resources for time resource formats 305-*a* and 305-*b* and are downlink resources 315, network entity 105-*a* may indicate CTRs 320 for these time resources. For instance, a network entity 105 may indicate CTR 320-*a* for time resource 325-*a*, may indicate CTR 320-*b* for time resource 325-*b*, may indicate CTR 320-*c* for time resource 325-*d*, and may indicate CTR 320-*d* for time resource 325-*e*. However, because time resource 325-*c* is associated with different types of resources for time resource formats 305-*a* and 305-*b*, a network entity 105 may not indicate a CTR 320 for time resource 325-*c*. Additionally, although time resource 325-*f* is associated with a same type of resource for time resource formats 305-*a* and 305-*b*, because the resources are uplink resources 310, the network entity 105 may not indicate a CTR 320 for time resource 325-*f* In some examples, each of time resources 325-*a* through 325-*f* may span a symbol.

In some examples, time resources 325-*a* through 325-*f* may be examples of symbols and the CTR 320 may be a symbol-level CTR 320. In some such examples, the slot level CTR may indicate multicasting slots in a slot or a sub-slot and may define the available time slots using a bitmap or a start and length indicator value (SLIV). In some examples, the CTR may depend on the slot type. For instance, a first CTR 235 may be defined for a full-duplex slot and a second, different CTR 235 may be defined for a half-duplex slot. Additionally or alternatively, the CTR may be the same for each type of slot.

In some examples, the CTR for a symbol-level time resource format may change based on the operating bandwidth part (BWP). For example, a narrowband BWP (e.g., a BWP with a width below a predefined threshold) may fall with a half-duplex-only region, in which CTR may not be configured or a CTR for all available time resources may be configured. Accordingly, if the operating BWP changes, the CTR may also change. Additionally, if no CTR is configured or if a null value for a CTR is configured, UEs may determine that all time resources are available for multicasting.

Figure 4:
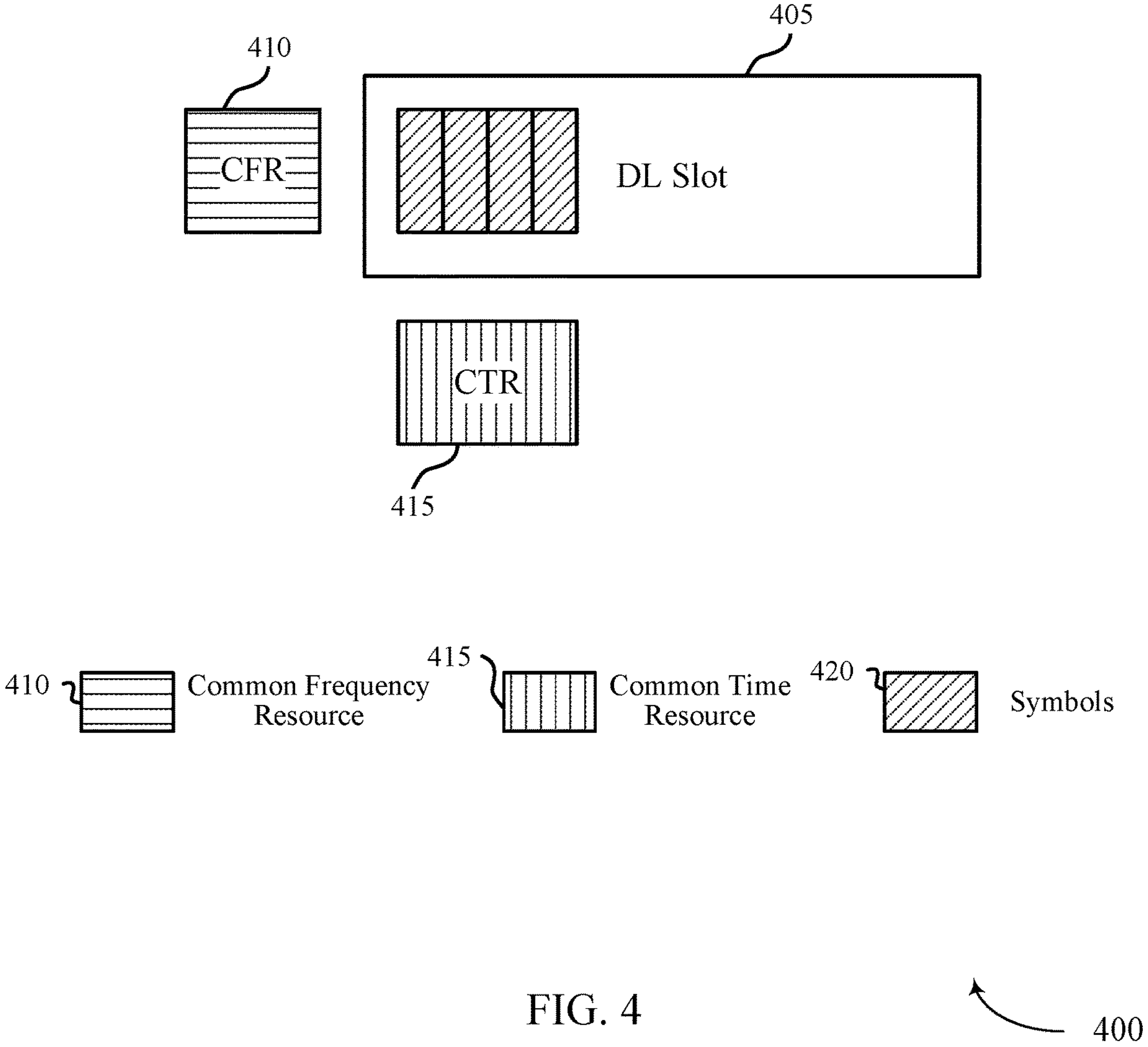
FIG. 4 illustrates an example of a time domain resource assignment scheme that supports common time resources for multicasting in accordance with one or more aspects of the present disclosure.

FIG. 4 illustrates an example of a time domain resource assignment (TDRA) scheme 400 that supports common time resources for multicasting in accordance with one or more aspects of the present disclosure.

For instance, a downlink slot 405 may have an associated common frequency resource (CFR) 410, which may be a set of frequency resources over which a multicast transmission is available to be received by multiple UEs 115 of a set of UEs 115 (e.g., a set of UEs 115 including half-duplex UEs 115 and full duplex UEs 115). Likewise, the downlink slot 405 may have an associated CTR. Together, the CFR and CTR may be associated with a set of symbols 420 that span CTR in time and the CFR in frequency. In some examples, the first symbol of the CTR may not be the same as the first symbol of the downlink slot 405. A grant for a multicast transmission may include a TDRA (e.g., SLIV) that indicates resources of the CTR for the multicast transmission. Accordingly, in such examples, if a UE receives a grant indicating to receive a multicast transmission over an earliest symbol of a CTR 415, this earliest symbol of the CTR 415 may not be the same as the earliest symbol of the downlink slot. For instance, downlink control information (DCI) scheduling a multicast transmission may include a TDRA with respect to CTR 415. In some such examples, the TDRA may be a SLIV that points to symbol 0, where symbol 0 is a first symbol of the CTR 415, but may be different than the first symbol of downlink slot 405.

Figure 5:
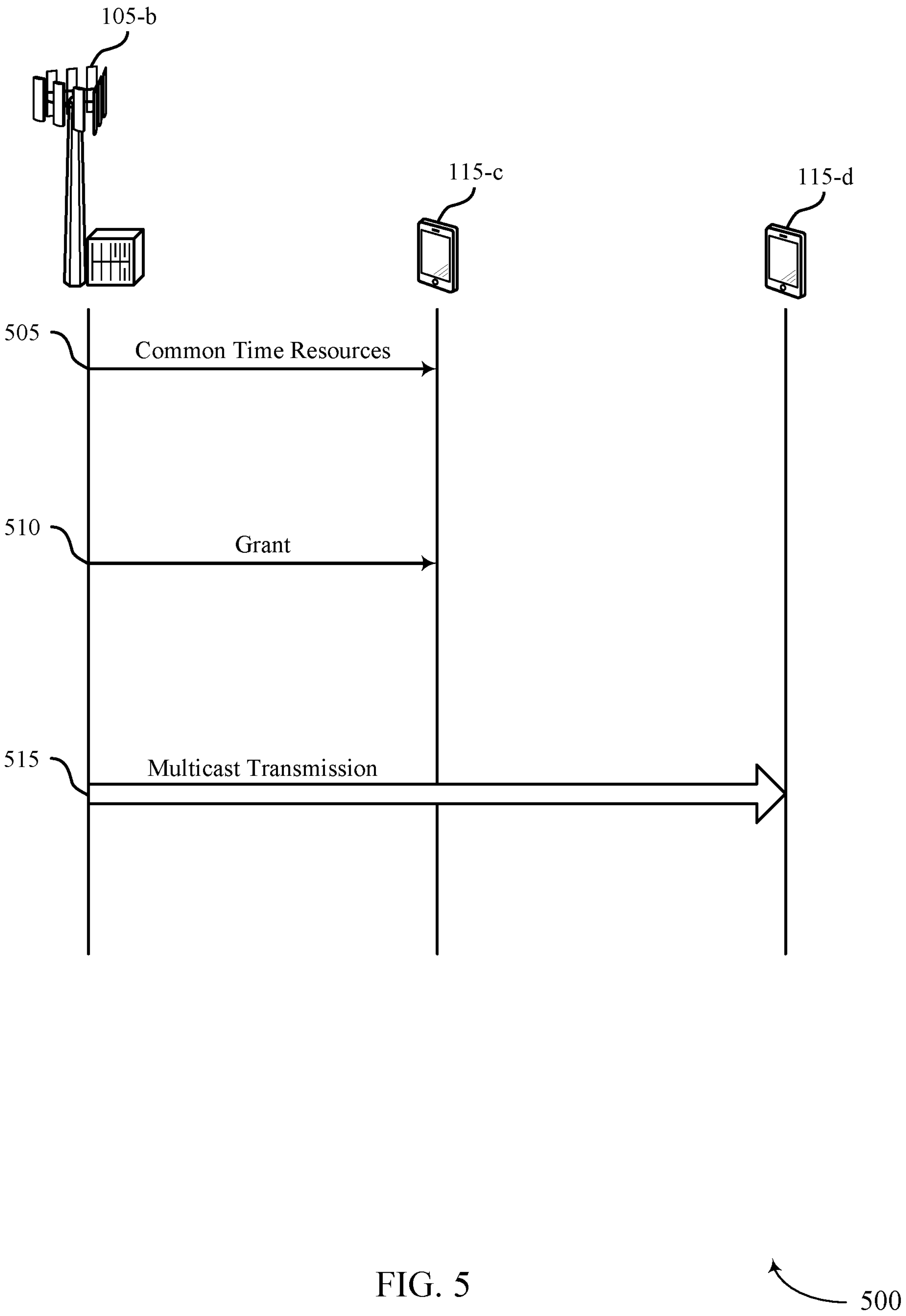
FIG. 5 illustrates an example of a process flow that supports common time resources for multicasting in accordance with one or more aspects of the present disclosure.

FIG. 5 illustrates an example of a process flow 500 that supports common time resources for multicasting in accordance with one or more aspects of the present disclosure.

At 505, network entity 105-*b* may transmit, to UE 115-*c*, an indication of a set of time resources common to a set of UEs (e.g., UEs 115-*c* and 115-*d*) and available for communication of a multicast transmission from network entity 105-*b* to two or more of the set of UEs. In some examples, the set of time resources may be a subset of a plurality of time resources of a carrier configured for UE 115-*c*. In some examples, each time resource of the set of time resources corresponds to a respective symbol within a slot. In some such examples, the plurality of time resources spans the slot. In other examples, each time resource of the set of time resources corresponds to a respective slot within a frame or a sub-frame, where the plurality of time resources spans the frame or the sub-frame. In some examples, the indication of the set of time resources includes a bitmap or a SLIV.

At 510, network entity 105-*b* may transmit, to UE 115-*c*, a grant for the multicast transmission.

At 515, network entity 105-*b* may transmit, to UEs 115-*c* and 115-*d*, the multicast transmission over a subset of the set of time resources, where the subset of the set of time resources is determined based on scheduling information associated with (e.g., indicated by) the grant and the indication of the set of time resources.

In some examples, a first slot and a second slot are associated with different sets of time resources common to the set of UEs including UEs 115-*c* and 115-*d* and available for communication of the multicast transmission based on the first slot being associated with a first transmission mode (e.g., one of half-duplex or full-duplex) and the second slot being associated with a second transmission mode (e.g., the other of full-duplex or half-duplex). Additionally or alternatively, a first slot may be associated with a first transmission mode and a second slot may be associated with a second transmission mode, where each of the first slot and the second slot are associated with the set of time resources. In some examples, an earliest time resource of the set of time resources differs from an earliest time resource of the plurality of time resources. In some such examples, the subset of the set of time resources may include the earliest time resource of the set of time resources.

In some examples, network entity 105-*b* and/or UE 115-*c* may update the set of time resources based on adjust from communicating with each other in a first BWP (e.g., a first BWP associated with half-duplex-only communications) to communicating with each other in a second BWP (e.g., a second BWP associated with half duplex and full duplex communications). In some examples, UE 115-*c* may receive a null indication of the set of time resources (e.g., from network entity 105-*b*). UE 115-*c* may determine that each time resource within the plurality of time resources is available for communication of a second multicast transmission from network entity 105-*b* over a subset of the plurality of time resources based on receiving the null indication of the set of time resources.

Figure 6:
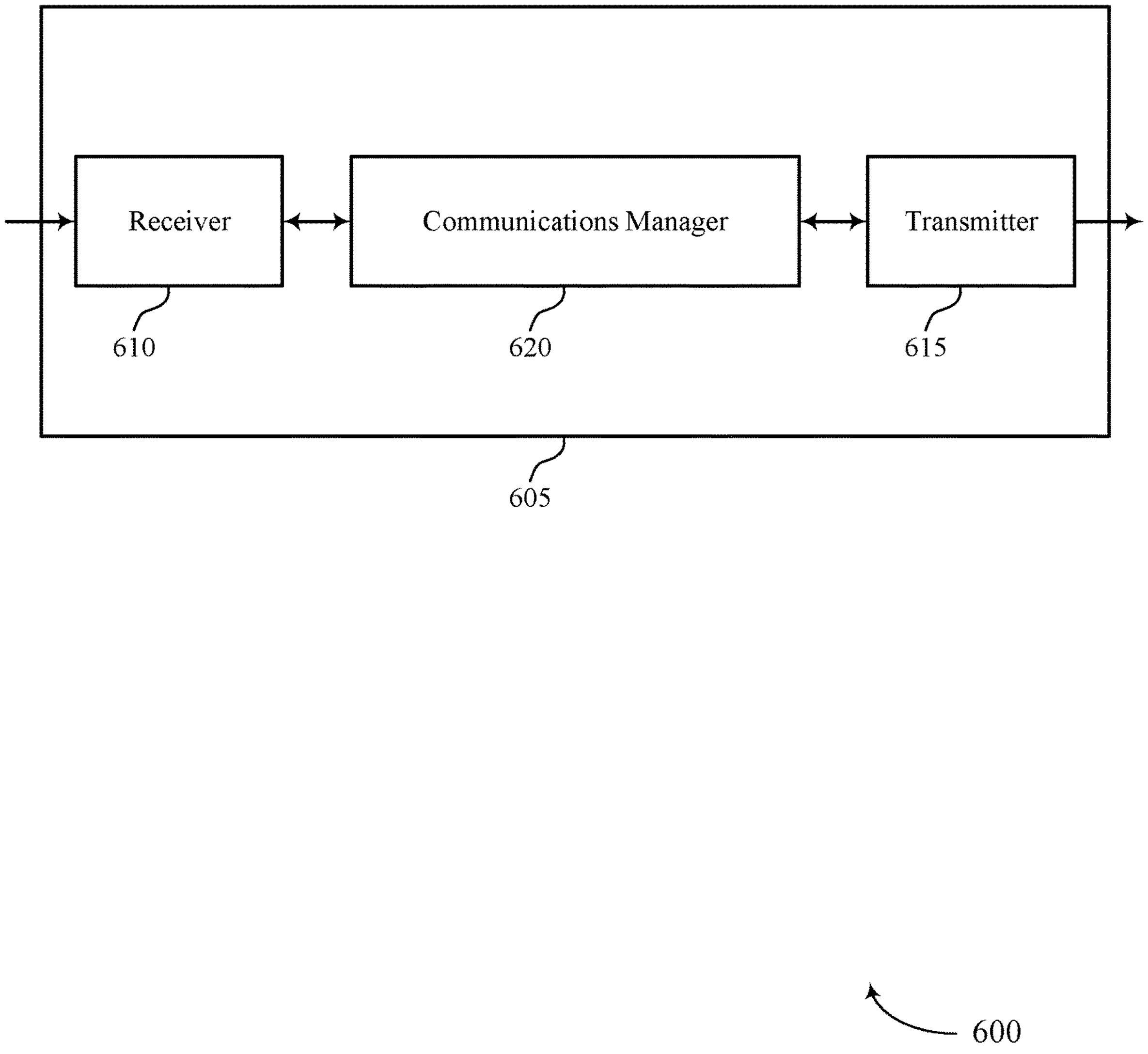
FIGS. 6 and 7 show block diagrams of devices that support common time resources for multicasting in accordance with one or more aspects of the present disclosure.

FIG. 6 shows a block diagram 600 of a device 605 that supports common time resources for multicasting in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to common time resources for multicasting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to common time resources for multicasting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of common time resources for multicasting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The communications manager 620 may be configured as or otherwise support a means for receiving, from the network entity, a grant for the multicast transmission. The communications manager 620 may be configured as or otherwise support a means for receiving, from the network entity, the multicast transmission over a subset of the set of time resources, where the subset of the set of time resources is determined based on scheduling information associated with the grant and the indication of the set of time resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for the device 605 to mitigate the likelihood that a network entity attempts to transmit a multicast transmission using communication parameters that do not account for a CLI and/or self-interference at the device 605.

Figure 7:
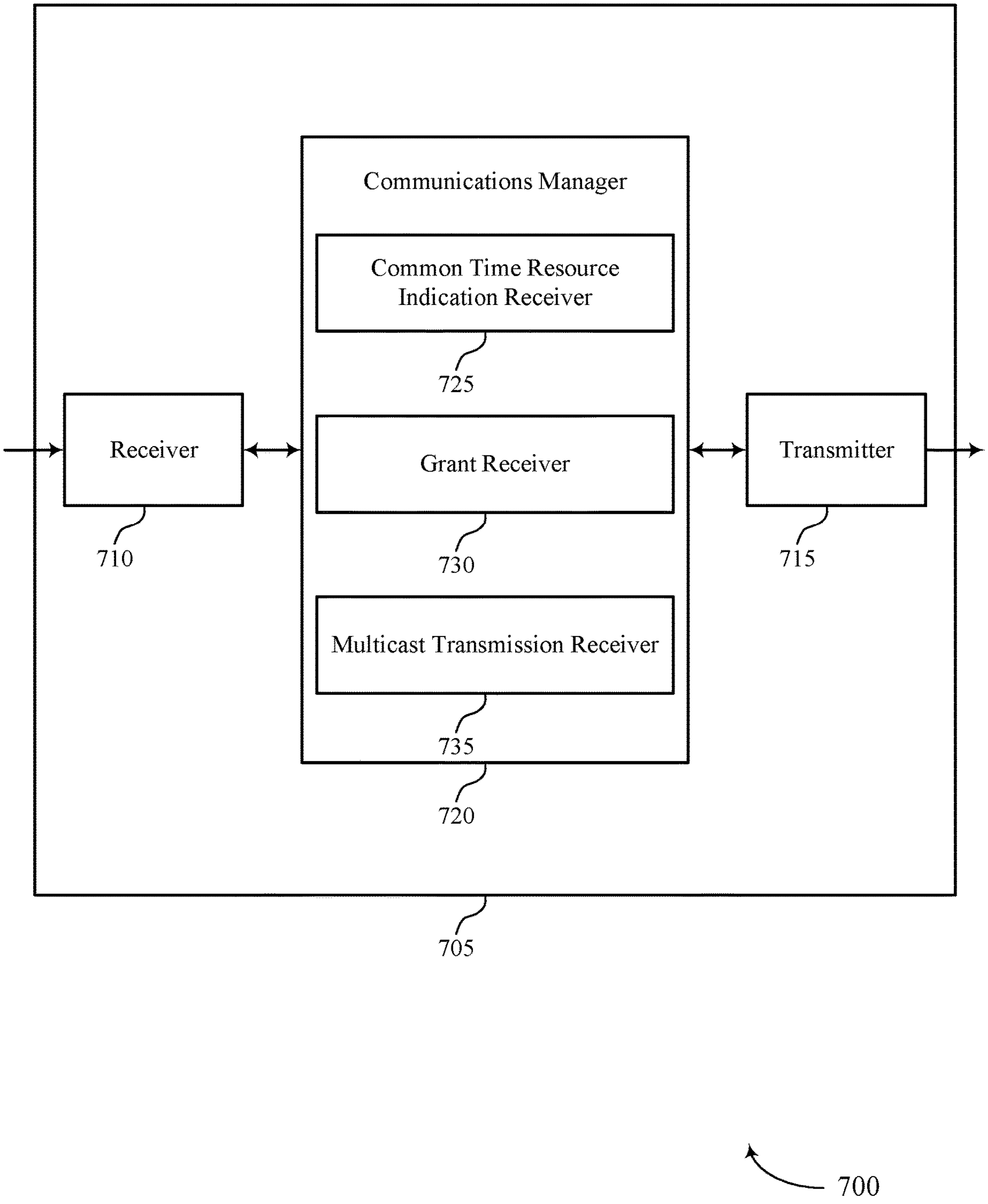

FIG. 7 shows a block diagram 700 of a device 705 that supports common time resources for multicasting in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to common time resources for multicasting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to common time resources for multicasting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of common time resources for multicasting as described herein. For example, the communications manager 720 may include a common time resource indication receiver 725, a grant receiver 730, a multicast transmission receiver 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The common time resource indication receiver 725 may be configured as or otherwise support a means for receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The grant receiver 730 may be configured as or otherwise support a means for receiving, from the network entity, a grant for the multicast transmission. The multicast transmission receiver 735 may be configured as or otherwise support a means for receiving, from the network entity, the multicast transmission over a subset of the set of time resources, where the subset of the set of time resources is determined based on scheduling information associated with the grant and the indication of the set of time resources.

Figure 8:
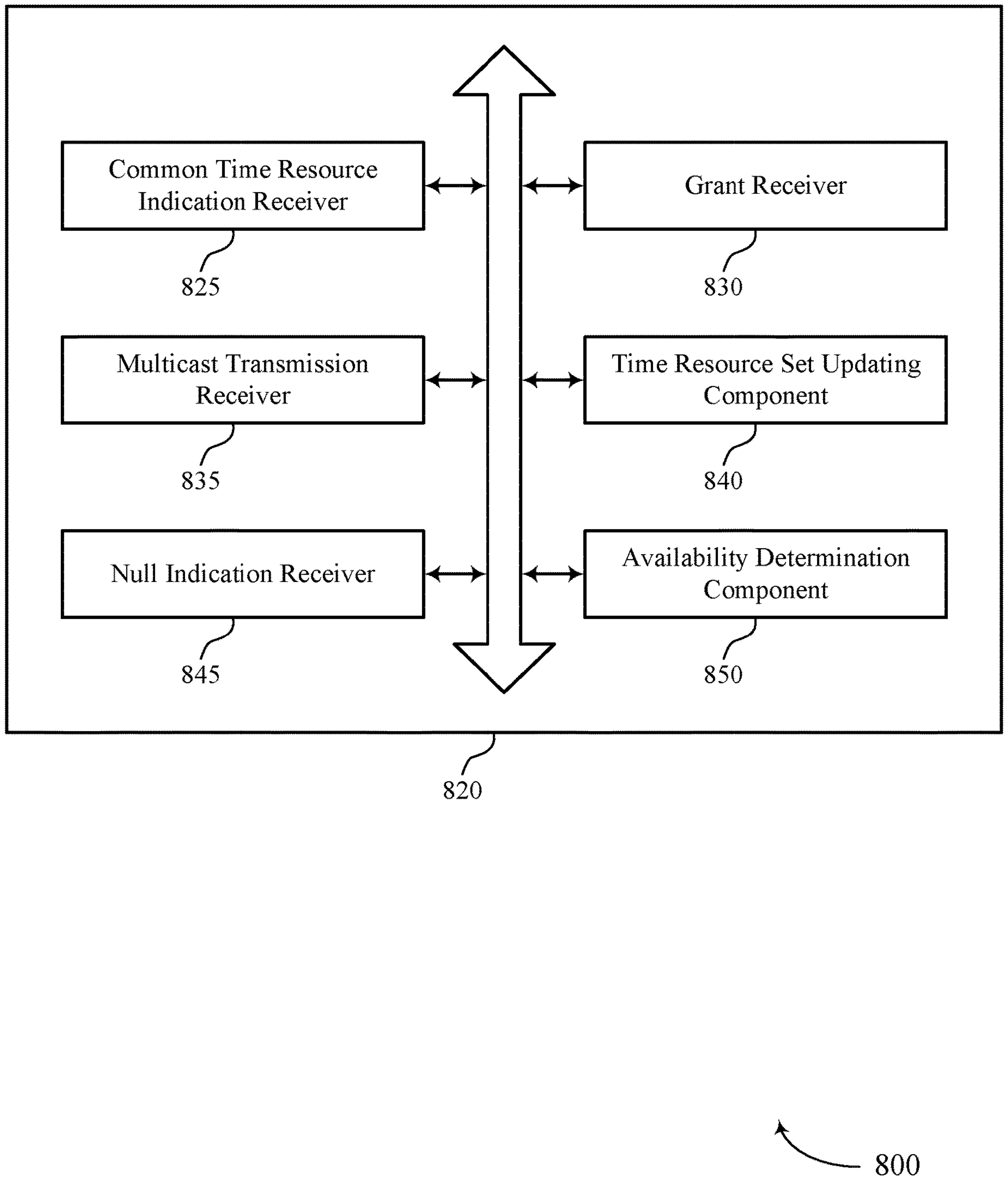
FIG. 8 shows a block diagram of a communications manager that supports common time resources for multicasting in accordance with one or more aspects of the present disclosure.

FIG. 8 shows a block diagram 800 of a communications manager 820 that supports common time resources for multicasting in accordance with one or more aspects of the present disclosure. The communications manager 820 may be an example of aspects of a communications manager 620, a communications manager 720, or both, as described herein. The communications manager 820, or various components thereof, may be an example of means for performing various aspects of common time resources for multicasting as described herein. For example, the communications manager 820 may include a common time resource indication receiver 825, a grant receiver 830, a multicast transmission receiver 835, a time resource set updating component 840, a null indication receiver 845, an availability determination component 850, or any combination thereof. Each of these components may communicate, directly or indirectly, with one another (e.g., via one or more buses).

The communications manager 820 may support wireless communication at a UE in accordance with examples as disclosed herein. The common time resource indication receiver 825 may be configured as or otherwise support a means for receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The grant receiver 830 may be configured as or otherwise support a means for receiving, from the network entity, a grant for the multicast transmission. The multicast transmission receiver 835 may be configured as or otherwise support a means for receiving, from the network entity, the multicast transmission over a subset of the set of time resources, where the subset of the set of time resources is determined based on scheduling information associated with the grant and the indication of the set of time resources.

In some examples, the time resource set updating component 840 may be configured as or otherwise support a means for updating the set of time resources based on adjusting from communicating with the network entity in a first bandwidth part to communicating with the network entity in a second bandwidth part.

In some examples, the null indication receiver 845 may be configured as or otherwise support a means for receiving a null indication of the set of time resources. In some examples, the availability determination component 850 may be configured as or otherwise support a means for determining that each time resource within the multiple time resources is available for communication of a second multicast transmission from the network entity based on receiving the null indication of the set of time resources. In some examples, the multicast transmission receiver 835 may be configured as or otherwise support a means for receiving a second multicast transmission over a subset of the multiple time resources based on the determining.

In some examples, each time resource of the set of time resources corresponds to a respective symbol within a slot. In some examples, the multiple time resources spans the slot.

In some examples, each time resource of the set of time resources corresponds to a respective slot within a frame or a sub-frame. In some examples, the multiple time resources spans the frame or the sub-frame.

In some examples, the indication of the set of time resources includes a bitmap or a start and length indicator value.

In some examples, a first slot and a second slot are associated with different sets of time resources common to the set of UEs and available for communication of the multicast transmission based on the first slot being associated with a first transmission mode and the second slot being associated with a second transmission mode.

In some examples, a first slot is associated with a first transmission mode and a second slot is associated with a second transmission mode. In some examples, each of the first slot and the second slot are associated with the set of time resources.

In some examples, an earliest time resource of the set of time resources differs from an earliest time resource of the multiple time resources.

Figure 9:
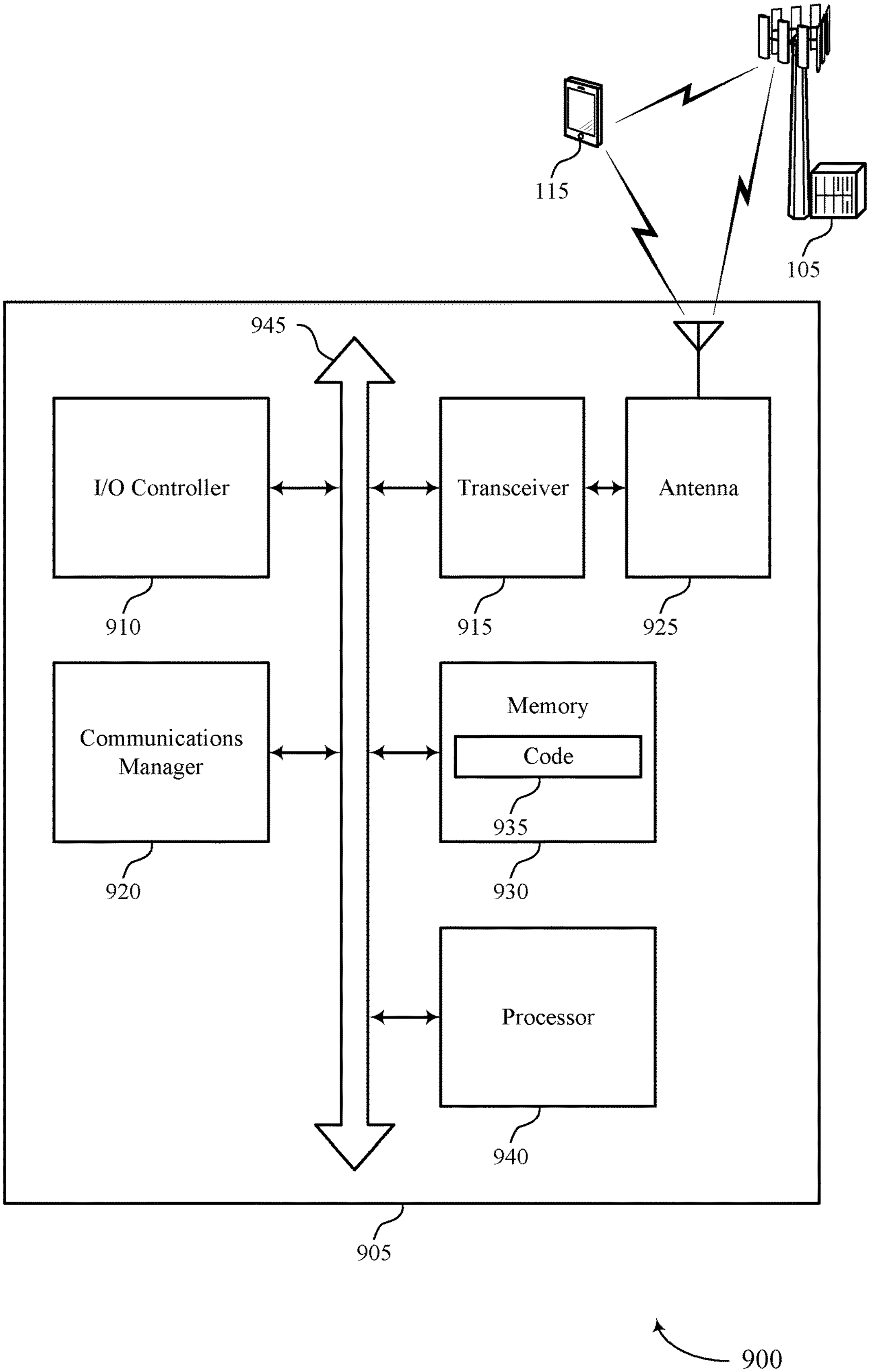
FIG. 9 shows a diagram of a system including a device that supports common time resources for multicasting in accordance with one or more aspects of the present disclosure.

FIG. 9 shows a diagram of a system 900 including a device 905 that supports common time resources for multicasting in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting common time resources for multicasting). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The communications manager 920 may be configured as or otherwise support a means for receiving, from the network entity, a grant for the multicast transmission. The communications manager 920 may be configured as or otherwise support a means for receiving, from the network entity, the multicast transmission over a subset of the set of time resources, where the subset of the set of time resources is determined based on scheduling information associated with the grant and the indication of the set of time resources.

By including or configuring the communications manager 920 in accordance with examples as described herein, the device 905 may support techniques for the device 905 to mitigate the likelihood that a network entity attempts to transmit a multicast transmission using communication parameters that do not account for a CLI and/or self-interference at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of common time resources for multicasting as described herein, or the processor 940 and the memory 930 may be otherwise configured to perform or support such operations.

Figure 10:
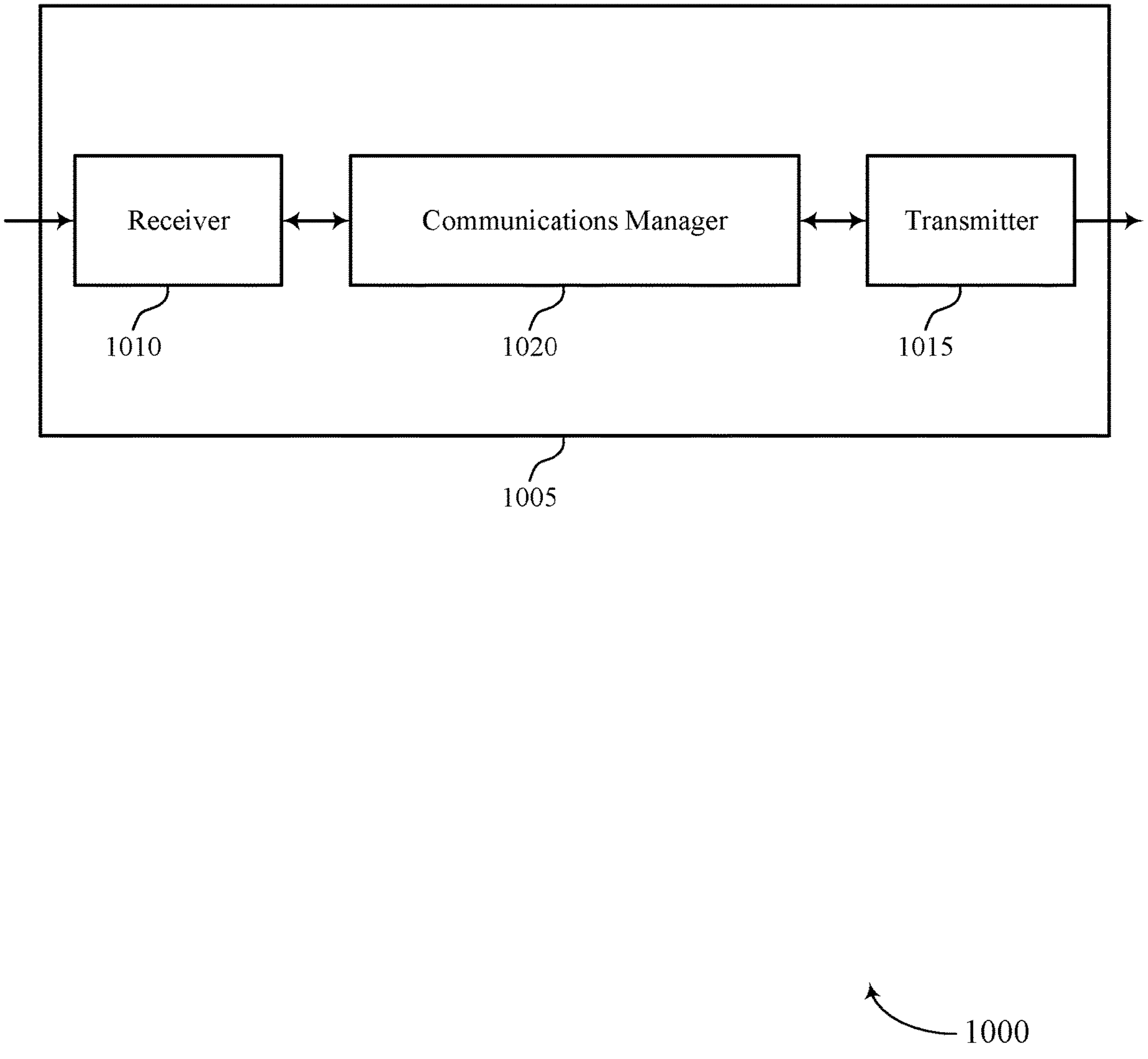
FIGS. 10 and 11 show block diagrams of devices that support common time resources for multicasting in accordance with one or more aspects of the present disclosure.

FIG. 10 shows a block diagram 1000 of a device 1005 that supports common time resources for multicasting in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of common time resources for multicasting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE, an indication of a set of time resources common to a set of UEs and available for communication of a multicast transmission from the network entity to two or more of the set of UEs, where the two or more of the set of UEs includes the UE, and where the set of time resources are a subset of multiple time resources. The communications manager 1020 may be configured as or otherwise support a means for transmitting, to the two or more of the set of UEs, a grant for the multicast transmission. The communications manager 1020 may be configured as or otherwise support a means for transmitting, to the two or more of the set of UEs, the multicast transmission over a subset of the set of time resources, where the subset of the set of time resources for transmitting the multicast transmission is based on scheduling information associated with the grant.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for the device 1005 to mitigate the likelihood that the device 1005 attempts to transmit a multicast transmission using communication parameters that do not account for a CLI and/or self-interference at a full-duplex UE.

Figure 11:
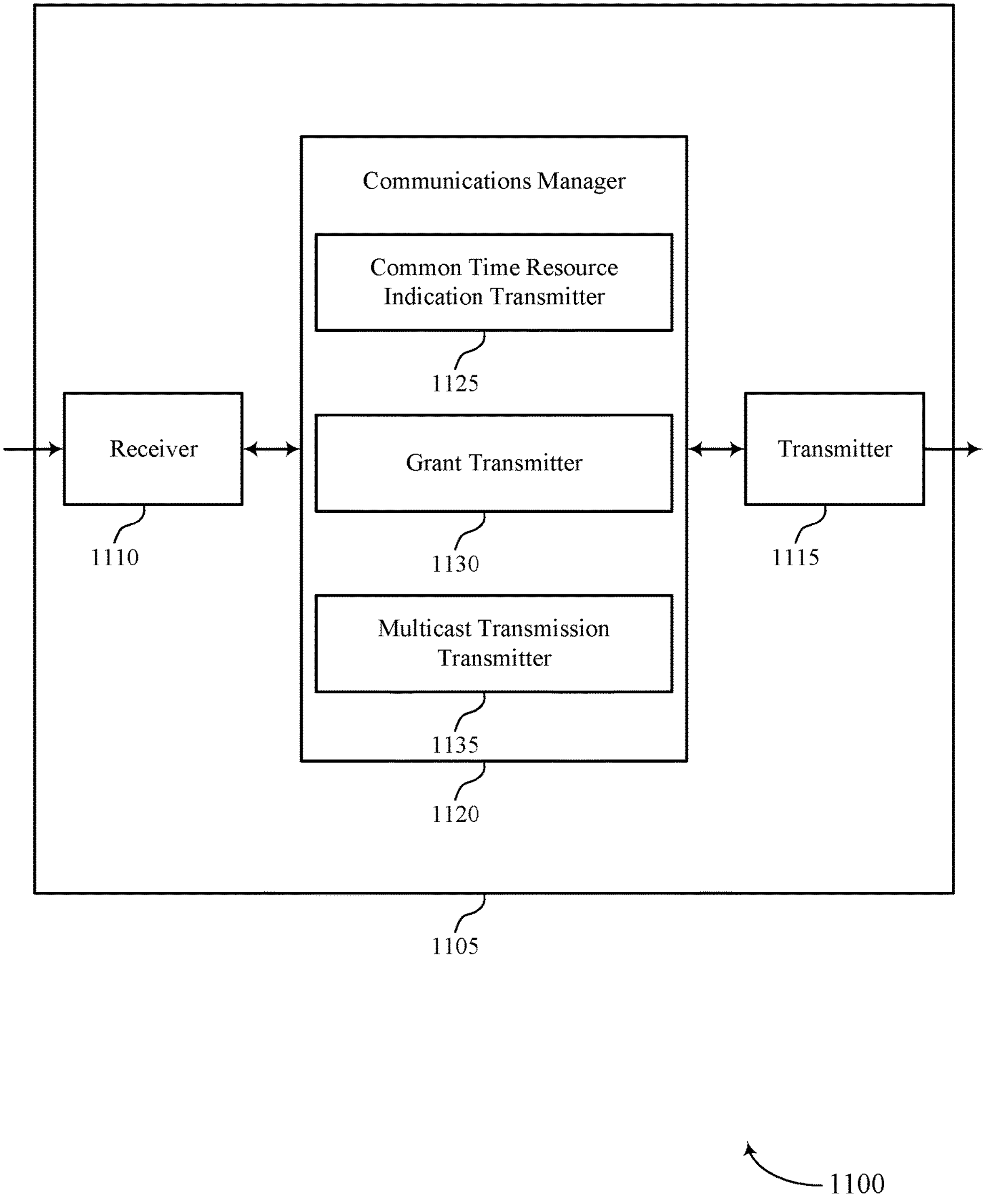

FIG. 11 shows a block diagram 1100 of a device 1105 that supports common time resources for multicasting in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of common time resources for multicasting as described herein. For example, the communications manager 1120 may include a common time resource indication transmitter 1125, a grant transmitter 1130, a multicast transmission transmitter 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The common time resource indication transmitter 1125 may be configured as or otherwise support a means for transmitting, to a UE, an indication of a set of time resources common to a set of UEs and available for communication of a multicast transmission from the network entity to two or more of the set of UEs, where the two or more of the set of UEs includes the UE, and where the set of time resources are a subset of multiple time resources. The grant transmitter 1130 may be configured as or otherwise support a means for transmitting, to the two or more of the set of UEs, a grant for the multicast transmission. The multicast transmission transmitter 1135 may be configured as or otherwise support a means for transmitting, to the two or more of the set of UEs, the multicast transmission over a subset of the set of time resources, where the subset of the set of time resources for transmitting the multicast transmission is based on scheduling information associated with the grant.

Figure 12:
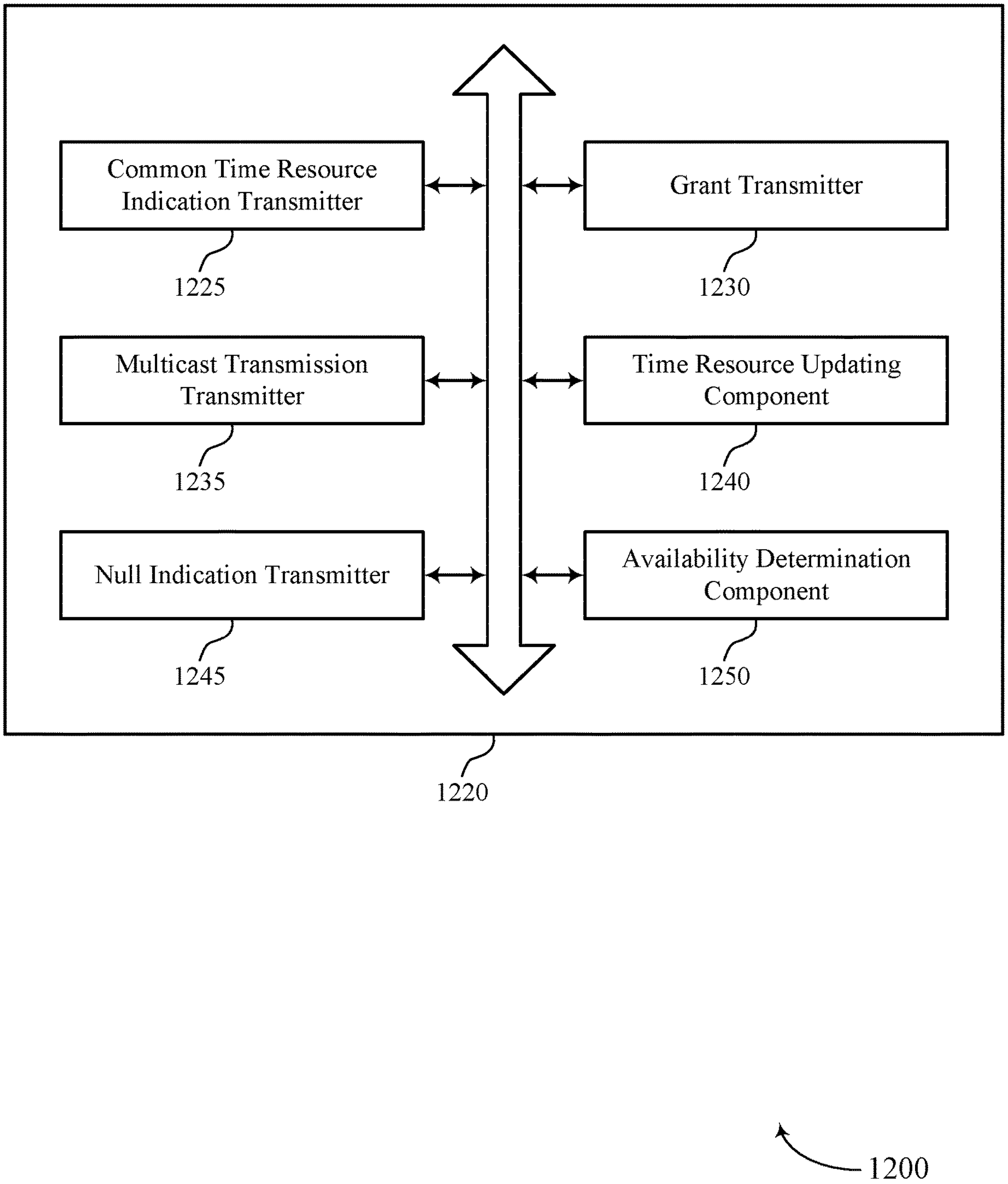
FIG. 12 shows a block diagram of a communications manager that supports common time resources for multicasting in accordance with one or more aspects of the present disclosure.

FIG. 12 shows a block diagram 1200 of a communications manager 1220 that supports common time resources for multicasting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of common time resources for multicasting as described herein. For example, the communications manager 1220 may include a common time resource indication transmitter 1225, a grant transmitter 1230, a multicast transmission transmitter 1235, a time resource updating component 1240, a null indication transmitter 1245, an availability determination component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The common time resource indication transmitter 1225 may be configured as or otherwise support a means for transmitting, to a UE, an indication of a set of time resources common to a set of UEs and available for communication of a multicast transmission from the network entity to two or more of the set of UEs, where the two or more of the set of UEs includes the UE, and where the set of time resources are a subset of multiple time resources. The grant transmitter 1230 may be configured as or otherwise support a means for transmitting, to the two or more of the set of UEs, a grant for the multicast transmission. The multicast transmission transmitter 1235 may be configured as or otherwise support a means for transmitting, to the two or more of the set of UEs, the multicast transmission over a subset of the set of time resources, where the subset of the set of time resources for transmitting the multicast transmission is based on scheduling information associated with the grant.

In some examples, the time resource updating component 1240 may be configured as or otherwise support a means for updating the set of time resources based on adjusting from communicating with the UE in a first bandwidth part to communicating with the UE in a second bandwidth part.

In some examples, the null indication transmitter 1245 may be configured as or otherwise support a means for transmitting a null indication of the set of time resources. In some examples, the availability determination component 1250 may be configured as or otherwise support a means for determining that each time resource within the multiple time resources is available for communication of a second multicast transmission from the network entity based on transmitting the null indication of the set of time resources. In some examples, the multicast transmission transmitter 1235 may be configured as or otherwise support a means for transmitting a second multicast transmission over a subset of the multiple time resources based on the determining.

In some examples, each time resource of the set of time resources corresponds to a respective symbol within a slot. In some examples, the multiple time resources spans the slot.

In some examples, each time resource of the set of time resources corresponds to a respective slot within a frame or a sub-frame. In some examples, the multiple time resources spans the frame or the sub-frame.

In some examples, the indication of the set of time resources includes a bitmap or a start and length indicator value.

In some examples, a first slot and a second slot are associated with different sets of time resources common to the set of UEs and available for communication of the multicast transmission based on the first slot being associated with a first transmission mode and the second slot being associated with a second transmission mode.

In some examples, a first slot is associated with a first transmission mode and a second slot is associated with a second transmission mode. In some examples, each of the first slot and the second slot are associated with the set of time resources.

In some examples, an earliest time resource of the set of time resources differs from an earliest time resource of the multiple time resources.

Figure 13:
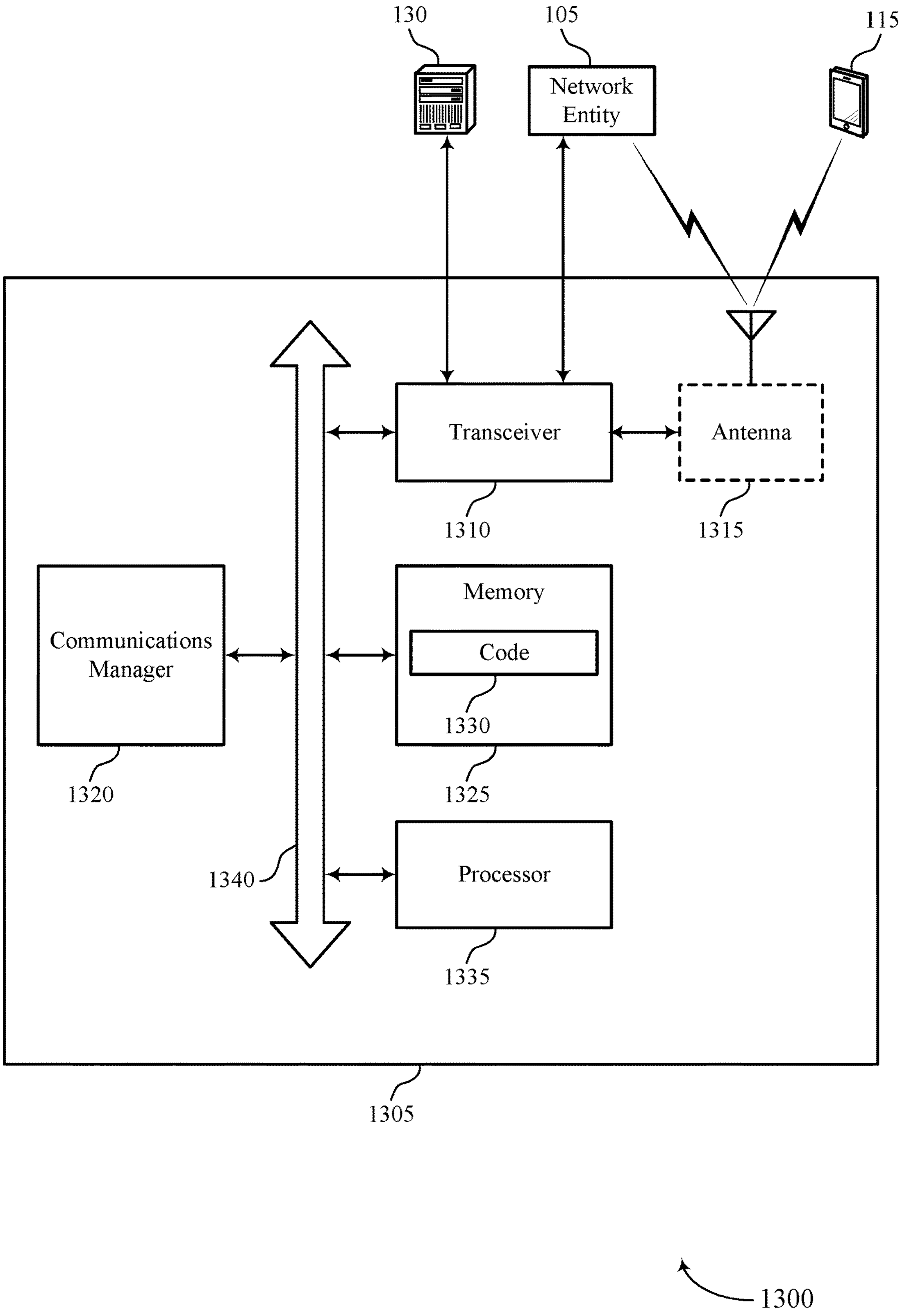
FIG. 13 shows a diagram of a system including a device that supports common time resources for multicasting in accordance with one or more aspects of the present disclosure.

FIG. 13 shows a diagram of a system 1300 including a device 1305 that supports common time resources for multicasting in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting common time resources for multicasting). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, an indication of a set of time resources common to a set of UEs and available for communication of a multicast transmission from the network entity to two or more of the set of UEs, where the two or more of the set of UEs includes the UE, and where the set of time resources are a subset of multiple time resources. The communications manager 1320 may be configured as or otherwise support a means for transmitting, to the two or more of the set of UEs, a grant for the multicast transmission. The communications manager 1320 may be configured as or otherwise support a means for transmitting, to the two or more of the set of UEs, the multicast transmission over a subset of the set of time resources, where the subset of the set of time resources for transmitting the multicast transmission is based on scheduling information associated with the grant.

By including or configuring the communications manager 1320 in accordance with examples as described herein, the device 1305 may support techniques for the device 1305 to mitigate the likelihood that the device 1305 attempts to transmit a multicast transmission using communication parameters that do not account for a CLI and/or self-interference at a full-duplex UE.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of common time resources for multicasting as described herein, or the processor 1335 and the memory 1325 may be otherwise configured to perform or support such operations.

Figure 14:
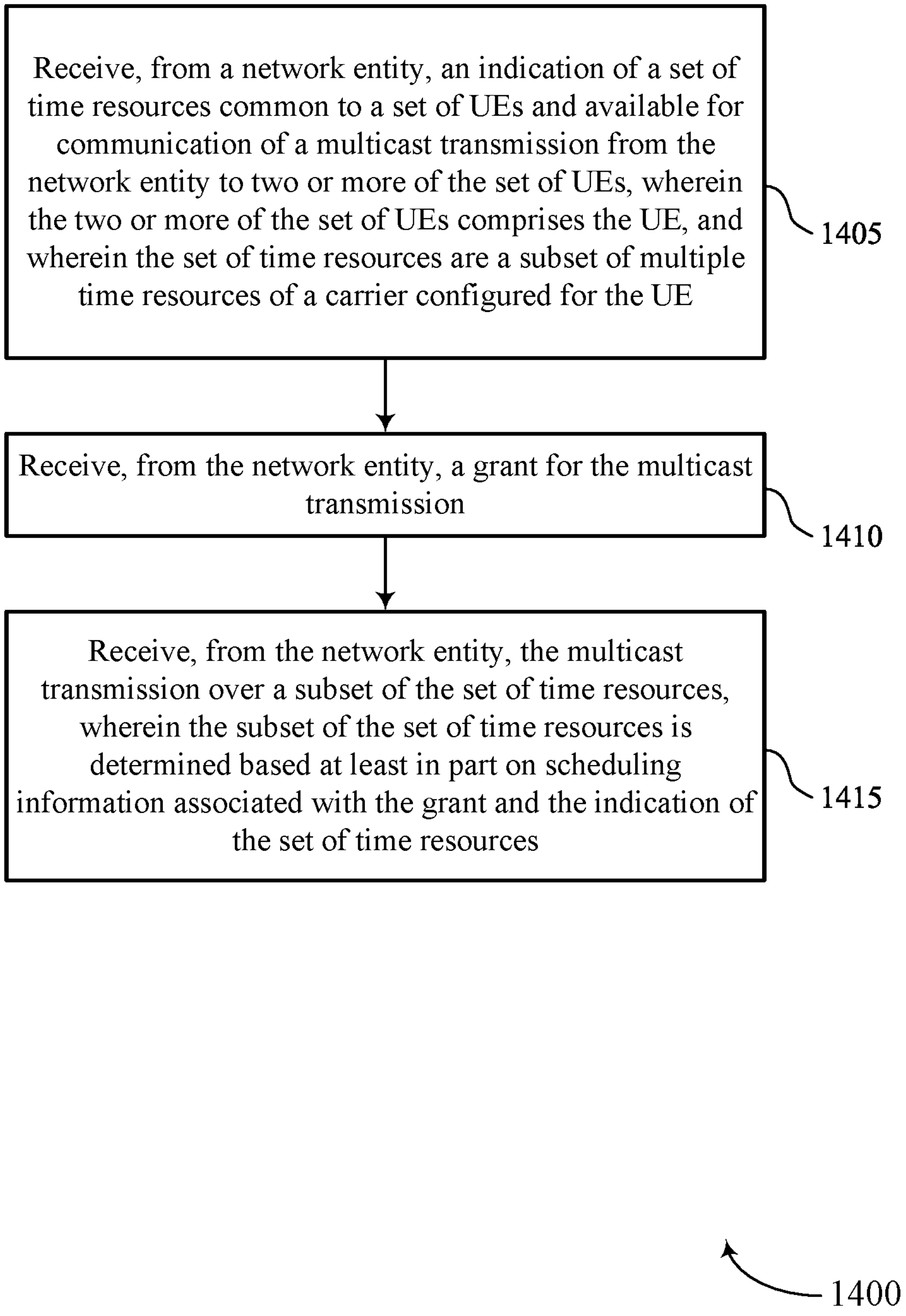
FIGS. 14 through 17 show flowcharts illustrating methods that support common time resources for multicasting in accordance with one or more aspects of the present disclosure.

FIG. 14 shows a flowchart illustrating a method 1400 that supports common time resources for multicasting in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The operations of 1405 may be performed in accordance with examples as disclosed herein. In some examples, aspects of the operations of 1405 may be performed by a common time resource indication receiver 825 as described with reference to FIG. 8.

At 1410, the method may include receiving, from the network entity, a grant for the multicast transmission. The operations of 1410 may be performed in accordance with examples as disclosed herein. In some examples, aspects of the operations of 1410 may be performed by a grant receiver 830 as described with reference to FIG. 8.

At 1415, the method may include receiving, from the network entity, the multicast transmission over a subset of the set of time resources, where the subset of the set of time resources is determined based on scheduling information associated with the grant and the indication of the set of time resources. The operations of 1415 may be performed in accordance with examples as disclosed herein. In some examples, aspects of the operations of 1415 may be performed by a multicast transmission receiver 835 as described with reference to FIG. 8.

Figure 15:
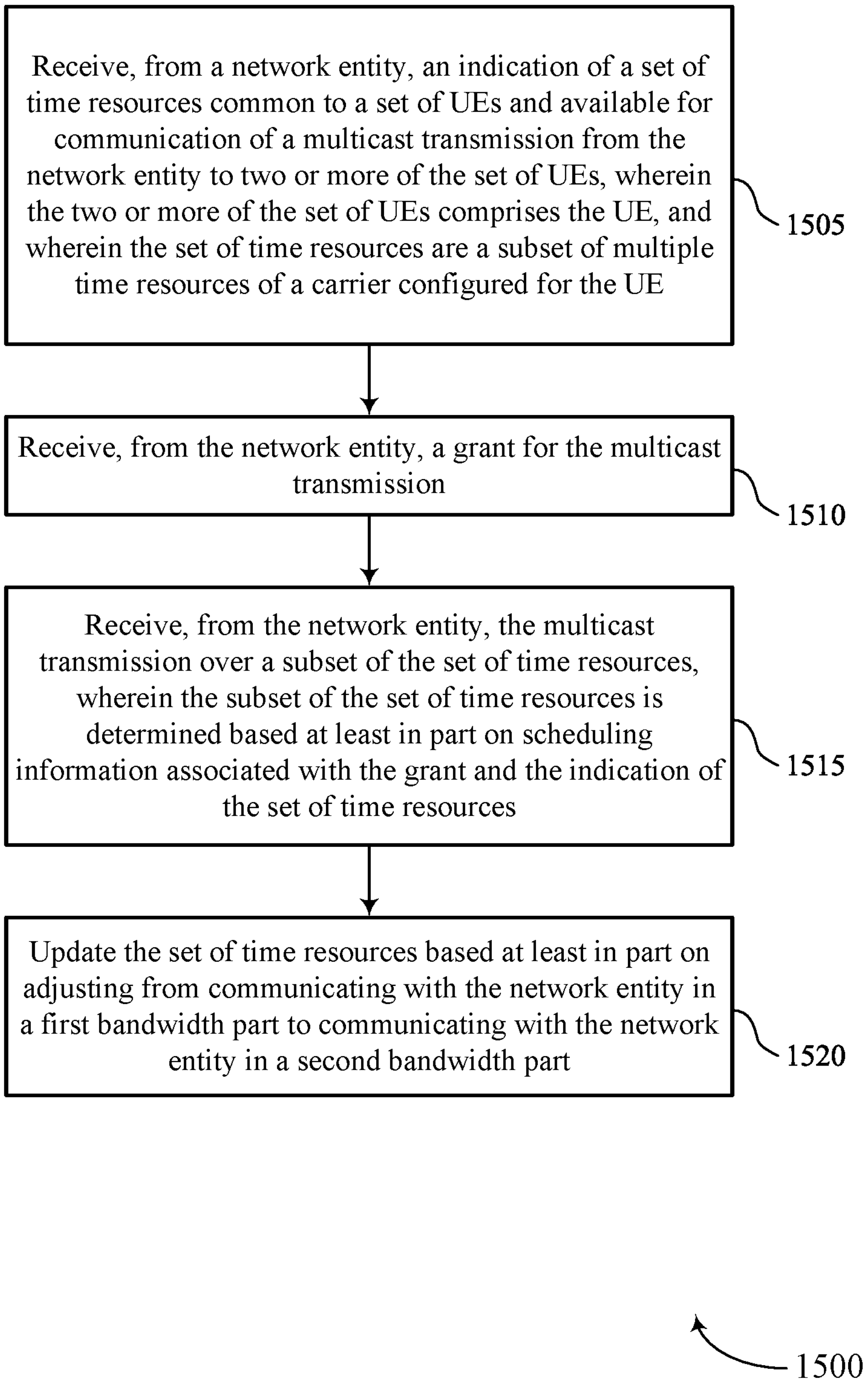

FIG. 15 shows a flowchart illustrating a method 1500 that supports common time resources for multicasting in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The operations of 1505 may be performed in accordance with examples as disclosed herein. In some examples, aspects of the operations of 1505 may be performed by a common time resource indication receiver 825 as described with reference to FIG. 8.

At 1510, the method may include receiving, from the network entity, a grant for the multicast transmission. The operations of 1510 may be performed in accordance with examples as disclosed herein. In some examples, aspects of the operations of 1510 may be performed by a grant receiver 830 as described with reference to FIG. 8.

At 1515, the method may include receiving, from the network entity, the multicast transmission over a subset of the set of time resources, where the subset of the set of time resources is determined based on scheduling information associated with the grant and the indication of the set of time resources. The operations of 1515 may be performed in accordance with examples as disclosed herein. In some examples, aspects of the operations of 1515 may be performed by a multicast transmission receiver 835 as described with reference to FIG. 8.

At 1520, the method may include updating the set of time resources based on adjusting from communicating with the network entity in a first bandwidth part to communicating with the network entity in a second bandwidth part. The operations of 1520 may be performed in accordance with examples as disclosed herein. In some examples, aspects of the operations of 1520 may be performed by a time resource set updating component 840 as described with reference to FIG. 8.

Figure 16:
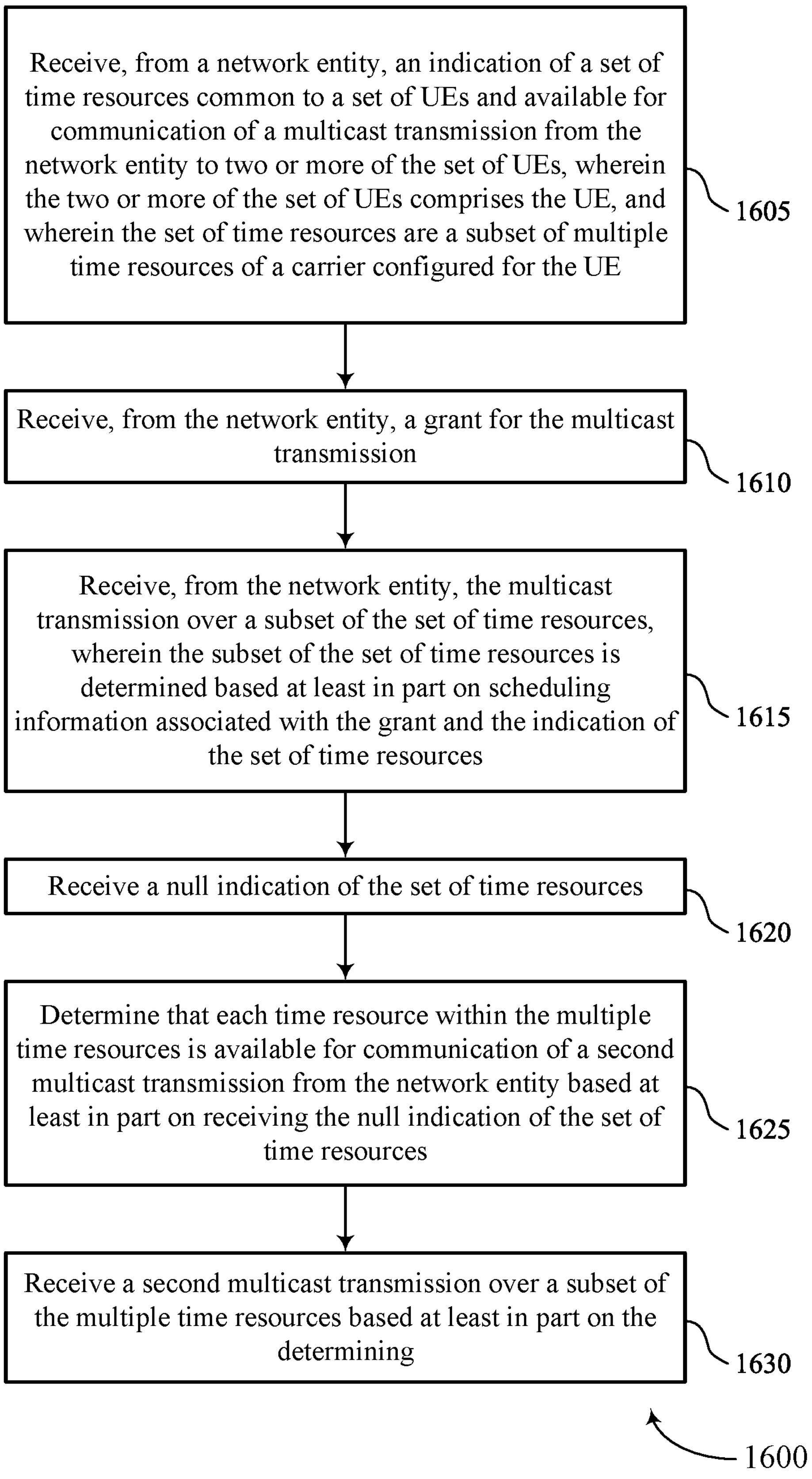

FIG. 16 shows a flowchart illustrating a method 1600 that supports common time resources for multicasting in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, an indication of a set of time resources common to a set of UEs and available for communication of a multicast transmission from the network entity to two or more of the set of UEs, where the two or more of the set of UEs includes the UE, and where the set of time resources are a subset of multiple time resources of a carrier configured for the UE. The operations of 1605 may be performed in accordance with examples as disclosed herein. In some examples, aspects of the operations of 1605 may be performed by a common time resource indication receiver 825 as described with reference to FIG. 8.

At 1610, the method may include receiving, from the network entity, a grant for the multicast transmission. The operations of 1610 may be performed in accordance with examples as disclosed herein. In some examples, aspects of the operations of 1610 may be performed by a grant receiver 830 as described with reference to FIG. 8.

At 1615, the method may include receiving, from the network entity, the multicast transmission over a subset of the set of time resources, where the subset of the set of time resources is determined based on scheduling information associated with the grant and the indication of the set of time resources. The operations of 1615 may be performed in accordance with examples as disclosed herein. In some examples, aspects of the operations of 1615 may be performed by a multicast transmission receiver 835 as described with reference to FIG. 8.

At 1620, the method may include receiving a null indication of the set of time resources. The operations of 1620 may be performed in accordance with examples as disclosed herein. In some examples, aspects of the operations of 1620 may be performed by a null indication receiver 845 as described with reference to FIG. 8.

At 1625, the method may include determining that each time resource within the multiple time resources is available for communication of a second multicast transmission from the network entity based on receiving the null indication of the set of time resources. The operations of 1625 may be performed in accordance with examples as disclosed herein. In some examples, aspects of the operations of 1625 may be performed by an availability determination component 850 as described with reference to FIG. 8.

At 1630, the method may include receiving a second multicast transmission over a subset of the multiple time resources based on the determining. The operations of 1630 may be performed in accordance with examples as disclosed herein. In some examples, aspects of the operations of 1630 may be performed by a multicast transmission receiver 835 as described with reference to FIG. 8.

Figure 17:
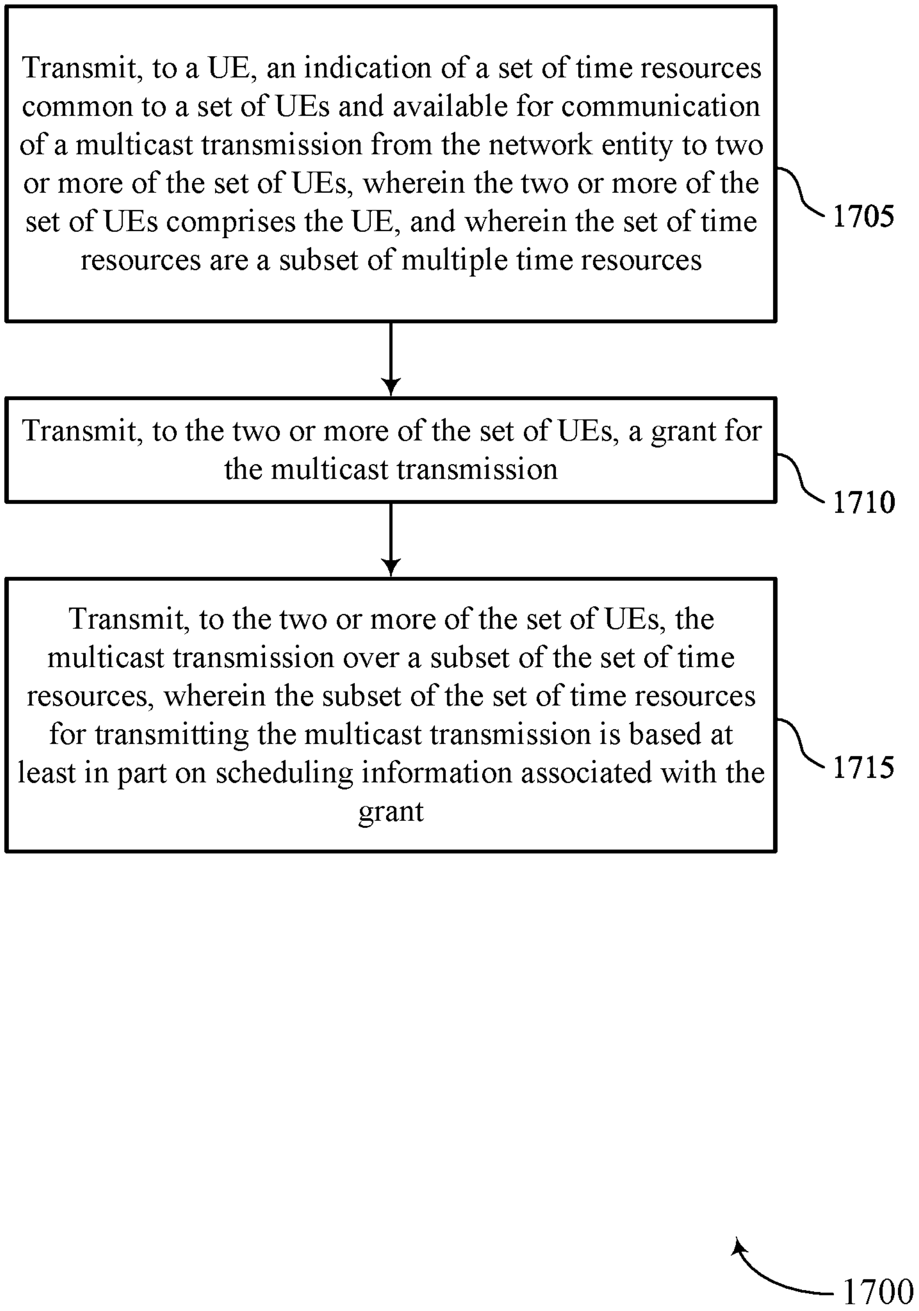

FIG. 17 shows a flowchart illustrating a method 1700 that supports common time resources for multicasting in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, an indication of a set of time resources common to a set of UEs and available for communication of a multicast transmission from the network entity to two or more of the set of UEs, where the two or more of the set of UEs includes the UE, and where the set of time resources are a subset of multiple time resources. The operations of 1705 may be performed in accordance with examples as disclosed herein.

In some examples, aspects of the operations of 1705 may be performed by a common time resource indication transmitter 1225 as described with reference to FIG. 12.

At 1710, the method may include transmitting, to the two or more of the set of UEs, a grant for the multicast transmission. The operations of 1710 may be performed in accordance with examples as disclosed herein. In some examples, aspects of the operations of 1710 may be performed by a grant transmitter 1230 as described with reference to FIG. 12.

At 1715, the method may include transmitting, to the two or more of the set of UEs, the multicast transmission over a subset of the set of time resources, where the subset of the set of time resources for transmitting the multicast transmission is based on scheduling information associated with the grant. The operations of 1715 may be performed in accordance with examples as disclosed herein. In some examples, aspects of the operations of 1715 may be performed by a multicast transmission transmitter 1235 as described with reference to FIG. 12.

The following provides an overview of aspects of the present disclosure:

Aspect 1: A method for wireless communication at a UE, comprising: receiving, from a network entity, an indication of a set of time resources common to a set of UEs and available for communication of a multicast transmission from the network entity to two or more of the set of UEs, wherein the two or more of the set of UEs comprises the UE, and wherein the set of time resources are a subset of a plurality of time resources of a carrier configured for the UE; receiving, from the network entity, a grant for the multicast transmission; and receiving, from the network entity, the multicast transmission over a subset of the set of time resources, wherein the subset of the set of time resources is determined based at least in part on scheduling information associated with the grant and the indication of the set of time resources.

Aspect 2: The method of aspect 1, further comprising: updating the set of time resources based at least in part on adjusting from communicating with the network entity in a first bandwidth part to communicating with the network entity in a second bandwidth part.

Aspect 3: The method of any of aspects 1 through 2, further comprising: receiving a null indication of the set of time resources; determining that each time resource within the plurality of time resources is available for communication of a second multicast transmission from the network entity based at least in part on receiving the null indication of the set of time resources; and receiving a second multicast transmission over a subset of the plurality of time resources based at least in part on the determining.

Aspect 4: The method of any of aspects 1 through 3, wherein. each time resource of the set of time resources corresponds to a respective symbol within a slot, and the plurality of time resources spans the slot Aspect 5: The method of any of aspects 1 through 4, wherein. each time resource of the set of time resources corresponds to a respective slot within a frame or a sub-frame, and the plurality of time resources spans the frame or the sub-frame Aspect 6: The method of any of aspects 1 through 5, wherein the indication of the set of time resources comprises a bitmap or a start and length indicator value.

Aspect 7: The method of any of aspects 1 through 6, wherein a first slot and a second slot are associated with different sets of time resources common to the set of UEs and available for communication of the multicast transmission based at least in part on the first slot being associated with a first transmission mode and the second slot being associated with a second transmission mode.

Aspect 8: The method of any of aspects 1 through 7, wherein. a first slot is associated with a first transmission mode and a second slot is associated with a second transmission mode, and each of the first slot and the second slot are associated with the set of time resources Aspect 9: The method of any of aspects 1 through 8, wherein the subset of the set of time resources comprises an earliest time resource of the set of time resources, and the earliest time resource of the set of time resources differs from an earliest time resource of the plurality of time resources.

Aspect 10: A method for wireless communication at a network entity, comprising: transmitting, to a UE, an indication of a set of time resources common to a set of UEs and available for communication of a multicast transmission from the network entity to two or more of the set of UEs, wherein the two or more of the set of UEs comprises the UE, and wherein the set of time resources are a subset of a plurality of time resources; transmitting, to the two or more of the set of UEs, a grant for the multicast transmission; and transmitting, to the two or more of the set of UEs, the multicast transmission over a subset of the set of time resources, wherein the subset of the set of time resources for transmitting the multicast transmission is based at least in part on scheduling information associated with the grant.

Aspect 11: The method of aspect 10, further comprising: updating the set of time resources based at least in part on adjusting from communicating with the UE in a first bandwidth part to communicating with the UE in a second bandwidth part.

Aspect 12: The method of any of aspects 10 through 11, further comprising: transmitting a null indication of the set of time resources; determining that each time resource within the plurality of time resources is available for communication of a second multicast transmission from the network entity based at least in part on transmitting the null indication of the set of time resources; and transmitting a second multicast transmission over a subset of the plurality of time resources based at least in part on the determining.

Aspect 13: The method of any of aspects 10 through 12, wherein. each time resource of the set of time resources corresponds to a respective symbol within a slot, and the plurality of time resources spans the slot Aspect 14: The method of any of aspects 10 through 13, wherein. each time resource of the set of time resources corresponds to a respective slot within a frame or a sub-frame, and the plurality of time resources spans the frame or the sub-frame Aspect 15: The method of any of aspects 10 through 14, wherein the indication of the set of time resources comprises a bitmap or a start and length indicator value.

Aspect 16: The method of any of aspects 10 through 15, wherein a first slot and a second slot are associated with different sets of time resources common to the set of UEs and available for communication of the multicast transmission based at least in part on the first slot being associated with a first transmission mode and the second slot being associated with a second transmission mode.

Aspect 17: The method of any of aspects 10 through 16, wherein. a first slot is associated with a first transmission mode and a second slot is associated with a second transmission mode, and each of the first slot and the second slot are associated with the set of time resources Aspect 18: The method of any of aspects 10 through 17, wherein the subset of the set of time resources comprises an earliest time resource of the set of time resources, and the earliest time resource of the set of time resources differs from an earliest time resource of the plurality of time resources.

Aspect 19: An apparatus for wireless communication at a UE, comprising a processor; memory coupled with the processor; and instructions stored in the memory and executable by the processor to cause the apparatus to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a network entity, comprising a processor; memory coupled with the processor; and instructions stored in the memory and executable by the processor to cause the apparatus to perform a method of any of aspects 10 through 18.

Aspect 23: An apparatus for wireless communication at a network entity, comprising at least one means for performing a method of any of aspects 10 through 18.

Aspect 24: A non-transitory computer-readable medium storing code for wireless communication at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network entity, an indication of a set of time resources common to a set of UEs and available for communication of a multicast transmission from the network entity to two or more of the set of UEs, wherein the two or more of the set of UEs comprises the UE, and wherein the set of time resources of the indication is a subset of a plurality of time resources of a carrier configured for the UE, and wherein the indication is for a case where the UE operates in duplex mode and for a case where the UE operates in half-duplex mode;

receiving, from the network entity, a grant for the multicast transmission; and receiving, from the network entity, the multicast transmission over a subset of the set of time resources of the indication, wherein the subset of the set of time resources of the indication is determined based at least in part on scheduling information associated with the grant and the indication of the set of time resources.

2. The method of claim 1, further comprising:

updating the set of time resources of the indication based at least in part on adjusting from communicating with the network entity in a first bandwidth part to communicating with the network entity in a second bandwidth part.

3. The method of claim 1, further comprising:

receiving a null indication of the set of time resources of the indication;

determining that each time resource within the plurality of time resources of the carrier configured for the UE is available for communication of a second multicast transmission from the network entity based at least in part on receiving the null indication of the set of time resources of the indication; and receiving a second multicast transmission over a subset of the plurality of time resources of the carrier configured for the UE based at least in part on the determining.

4. The method of claim 1, wherein each time resource of the set of time resources of the indication corresponds to a respective symbol within a slot, and the plurality of time resources of the carrier configured for the UE spans the slot.

5. The method of claim 1, wherein each time resource of the set of time resources of the indication corresponds to a respective slot within a frame or a sub-frame, and the plurality of time resources of the carrier configured for the UE spans the frame or the sub-frame.

6. The method of claim 1, wherein the indication of the set of time resources comprises a bitmap or a start and length indicator value.

7. The method of claim 1, wherein a first slot and a second slot are associated with different sets of time resources common to the set of UEs and available for communication of the multicast transmission based at least in part on the first slot being associated with a first transmission mode and the second slot being associated with a second transmission mode.

8. The method of claim 1, wherein a first slot is associated with a first transmission mode and a second slot is associated with a second transmission mode, and each of the first slot and the second slot are associated with the set of time resources.

9. The method of claim 1, wherein the subset of the set of time resources of the indication comprises an earliest time resource of the set of time resources of the indication, and wherein the earliest time resource of the set of time resources of the indication differs from an earliest time resource of the plurality of time resources of the carrier configured for the UE.

10. A method for wireless communication at a network entity, comprising:

transmitting, to a user equipment (UE), an indication of a set of time resources common to a set of UEs and available for communication of a multicast transmission from the network entity to two or more of the set of UEs, wherein the two or more of the set of UEs comprises the UE, and wherein the set of time resources of the indication is a subset of a plurality of time resources of a carrier configured for the UE, and wherein the indication is for a case where the UE operates in duplex mode and for a case where the UE operates in half-duplex mode;

transmitting, to the two or more of the set of UEs, a grant for the multicast transmission; and transmitting, to the two or more of the set of UEs, the multicast transmission over a subset of the set of time resources of the indication, wherein the subset of the set of time resources of the indication for transmitting the multicast transmission is based at least in part on scheduling information associated with the grant.

11. The method of claim 10, further comprising:

updating the set of time resources of the indication based at least in part on adjusting from communicating with the UE in a first bandwidth part to communicating with the UE in a second bandwidth part.

12. The method of claim 10, further comprising:

transmitting a null indication of the set of time resources of the indication;

determining that each time resource within the plurality of time resources of the carrier configured for the UE is available for communication of a second multicast transmission from the network entity based at least in part on transmitting the null indication of the set of time resources of the indication; and transmitting a second multicast transmission over a subset of the plurality of time resources of the carrier configured for the UE based at least in part on the determining.

13. The method of claim 10, wherein each time resource of the set of time resources of the indication corresponds to a respective symbol within a slot, and the plurality of time resources of the carrier configured for the UE spans the slot.

14. The method of claim 10, wherein each time resource of the set of time resources of the indication corresponds to a respective slot within a frame or a sub-frame, and the plurality of time resources of the carrier configured for the UE spans the frame or the sub-frame.

15. The method of claim 10, wherein the indication of the set of time resources of the indication comprises a bitmap or a start and length indicator value.

16. The method of claim 10, wherein a first slot and a second slot are associated with different sets of time resources common to the set of UEs and available for communication of the multicast transmission based at least in part on the first slot being associated with a first transmission mode and the second slot being associated with a second transmission mode.

17. The method of claim 10, wherein a first slot is associated with a first transmission mode and a second slot is associated with a second transmission mode, and each of the first slot and the second slot are associated with the set of time resources.

18. The method of claim 10, wherein the subset of the set of time resources of the indication comprises an earliest time resource of the set of time resources of the indication, and wherein the earliest time resource of the set of time resources of the indication differs from an earliest time resource of the plurality of time resources of the carrier configured for the UE.

19. An apparatus for wireless communication at a user equipment (UE), comprising:

a processor;

memory coupled with the processor; and instructions stored in the memory and executable by the processor to cause the apparatus to:

receive, from a network entity, an indication of a set of time resources common to a set of UEs and available for communication of a multicast transmission from the network entity to two or more of the set of UEs, wherein the two or more of the set of UEs comprises the UE, and wherein the set of time resources of the indication is a subset of a plurality of time resources of a carrier configured for the UE, and wherein the indication is for a case where the UE operates in duplex mode and for a case where the UE operates in half-duplex mode;

receive, from the network entity, a grant for the multicast transmission; and receive, from the network entity, the multicast transmission over a subset of the set of time resources of the indication, wherein the subset of the set of time resources of the indication is determined based at least in part on scheduling information associated with the grant and the indication of the set of time resources.

20. The apparatus of claim 19, wherein the instructions are further executable by the processor to cause the apparatus to:

update the set of time resources of the indication based at least in part on adjusting from communicating with the network entity in a first bandwidth part to communicating with the network entity in a second bandwidth part.

21. The apparatus of claim 19, wherein the instructions are further executable by the processor to cause the apparatus to:

receive a null indication of the set of time resources of the indication;

determine that each time resource within the plurality of time resources of the carrier configured for the UE is available for communication of a second multicast transmission from the network entity based at least in part on receiving the null indication of the set of time resources of the indication; and receive a second multicast transmission over a subset of the plurality of time resources of the carrier configured for the UE based at least in part on the determining.

22. The apparatus of claim 19, wherein:

each time resource of the set of time resources of the indication corresponds to a respective symbol within a slot, and the plurality of time resources spans the slot.

23. The apparatus of claim 19, wherein:

each time resource of the set of time resources of the indication corresponds to a respective slot within a frame or a sub-frame, and the plurality of time resources of the carrier configured for the UE spans the frame or the sub-frame.

24. The apparatus of claim 19, wherein the indication of the set of time resources comprises a bitmap or a start and length indicator value.

25. The apparatus of claim 19, wherein a first slot and a second slot are associated with different sets of time resources common to the set of UEs and available for communication of the multicast transmission based at least in part on the first slot being associated with a first transmission mode and the second slot being associated with a second transmission mode.

26. The apparatus of claim 19, wherein:

a first slot is associated with a first transmission mode and a second slot is associated with a second transmission mode, and each of the first slot and the second slot are associated with the set of time resources.

27. The apparatus of claim 19, wherein the subset of the set of time resources of the indication comprises an earliest time resource of the set of time resources of the indication, and wherein the earliest time resource of the set of time resources of the indication differs from an earliest time resource of the plurality of time resources of the carrier configured for the UE.

28. An apparatus for wireless communication at a network entity, comprising:

a processor, memory coupled with the processor; and instructions stored in the memory and executable by the processor to cause the apparatus to:

transmit, to a user equipment (UE), an indication of a set of time resources common to a set of UEs and available for communication of a multicast transmission from the network entity to two or more of the set of UEs, wherein the two or more of the set of UEs comprises the UE, and wherein the set of time resources of the indication is a subset of a plurality of time resources of a carrier configured for the UE, and wherein the indication is for a case where the UE operates in duplex mode and for a case where the UE operates in half-duplex mode;

transmit, to the two or more of the set of UEs, a grant for the multicast transmission; and transmit, to the two or more of the set of UEs, the multicast transmission over a subset of the set of time resources of the indication, wherein the subset of the set of time resources of the indication for transmitting the multicast transmission is based at least in part on scheduling information associated with the grant.

29. The apparatus of claim 28, wherein the instructions are further executable by the processor to cause the apparatus to:

update the set of time resources of the indication based at least in part on adjusting from communicating with the UE in a first bandwidth part to communicating with the UE in a second bandwidth part.

30. The apparatus of claim 28, wherein the instructions are further executable by the processor to cause the apparatus to:

transmit a null indication of the set of time resources;

determine that each time resource within the plurality of time resources of the carrier configured for the UE is available for communication of a second multicast transmission from the network entity based at least in part on transmitting the null indication of the set of time resources of the indication; and transmit a second multicast transmission over a subset of the plurality of time resources of the carrier configured for the UE based at least in part on the determining.

* * * * *